United States Patent [19]
Citta et al.

[11] Patent Number: 5,270,816
[45] Date of Patent: Dec. 14, 1993

[54] TV SIGNAL TRANSMISSION SYSTEMS AND METHODS

[75] Inventors: Richard W. Citta, Oak Park; Ronald B. Lee, Chicago, both of Ill.

[73] Assignee: Zenith Electronics Corporation, Glenview, Ill.

[21] Appl. No.: 908,772

[22] Filed: Jul. 1, 1992

Related U.S. Application Data

[63] Continuation of Ser. No. 453,660, Dec. 20, 1989, abandoned, which is a continuation-in-part of Ser. No. 238,956, Aug. 31, 1988, abandoned, which is a continuation-in-part of Ser. No. 176,893, Apr. 4, 1988, abandoned.

[51] Int. Cl.$^5$ .............................................. H04N 7/00
[52] U.S. Cl. .................................... 358/141; 358/148; 358/167
[58] Field of Search ............... 358/141, 142, 11, 12, 358/148, 149, 167

[56] References Cited

U.S. PATENT DOCUMENTS

| | | | |
|---|---|---|---|
| 2,437,300 | 3/1948 | Labin | 358/148 |
| 4,631,574 | 12/1986 | LoCicero et al. | 358/12 |
| 4,800,426 | 1/1989 | Glenn | 358/147 |

Primary Examiner—James J. Groody
Assistant Examiner—David E. Harvey

[57] ABSTRACT

A hybrid television signal of less transmission power or better signal to noise performance is made up by removing low frequency analog components from the video signal, digitizing them and sending them as data in nonactive video portions of the transmitted signal. A two step hybridization process, with the first step removing the line averaged value of the video components of the video signal and the second step removing the remainder of the video components under 200 KHz, is described. Temporal filtering, signal preemphasis, compression, time dispersion and double sideband suppressed carrier modulation about a centered carrier are disclosed for reducing peak signal amplitudes and for minimizing co-channel interference to and from NTSC signals. Time dispersion is done horizontally, vertically or both to reduce the peak signal amplitudes. Time dispersion in conjunction with low frequency removal and temporal filtering is preferred. Time dispersing lower frequencies more than higher frequencies contributes to an optimized video display. For cochannel NTSC signals, frame locking the hybrid signal to the NTSC co-channel "hides" the data in the hybrid in the NTSC vertical interval. The hybrid signal system is uniquely adapted to a high definition television signal in a limited frequency channel with an NTSC signal.

5 Claims, 17 Drawing Sheets

VIDEO SIGNAL

BASIC HYBRID

EXTENDED HYBRID

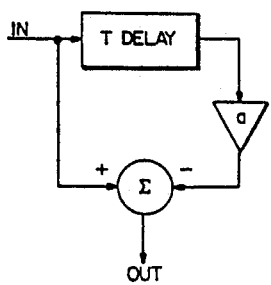
FIG. 17A
FIG. 17B
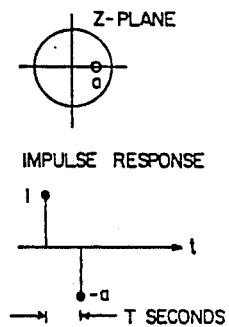
FIG. 17C
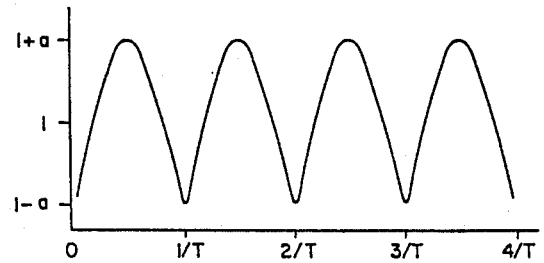
FIG. 17D
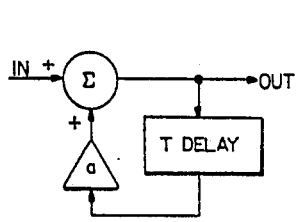
FIG. 18A
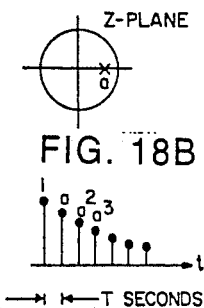
FIG. 18B
FIG. 18C
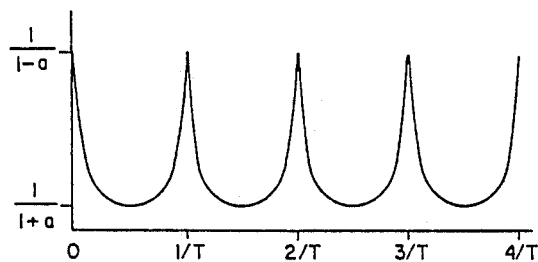
FIG. 18D
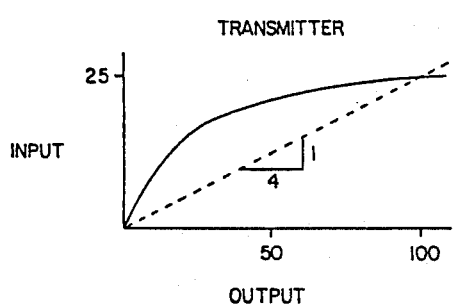
FIG. 19
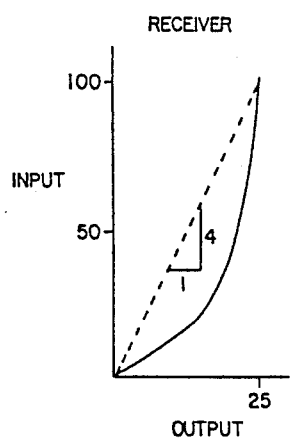
FIG. 20

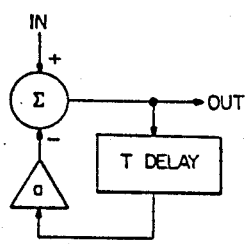
FIG. 21A
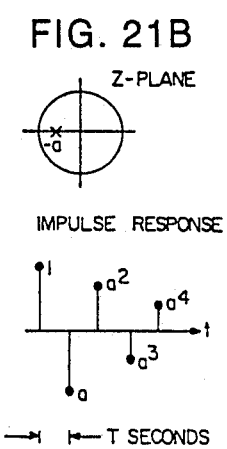
FIG. 21B
FIG. 21C
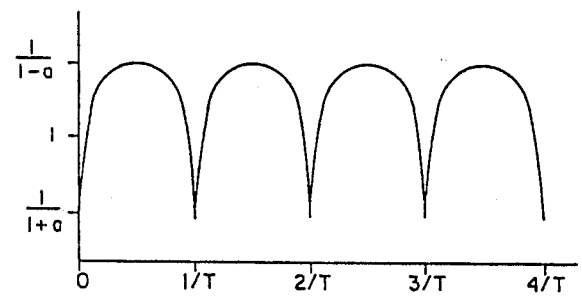
FIG. 21D
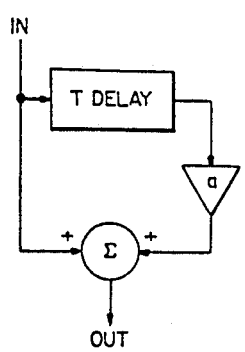
FIG. 22A
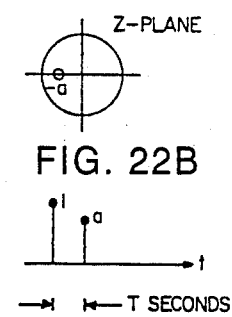
FIG. 22B
FIG. 22C
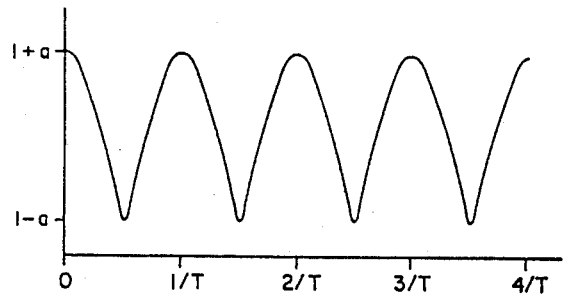
FIG. 22D

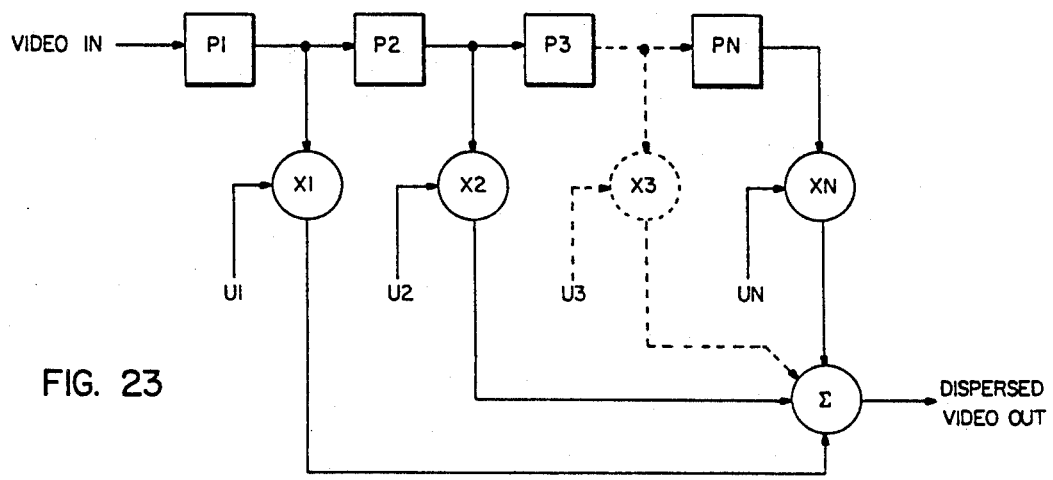
FIG. 23
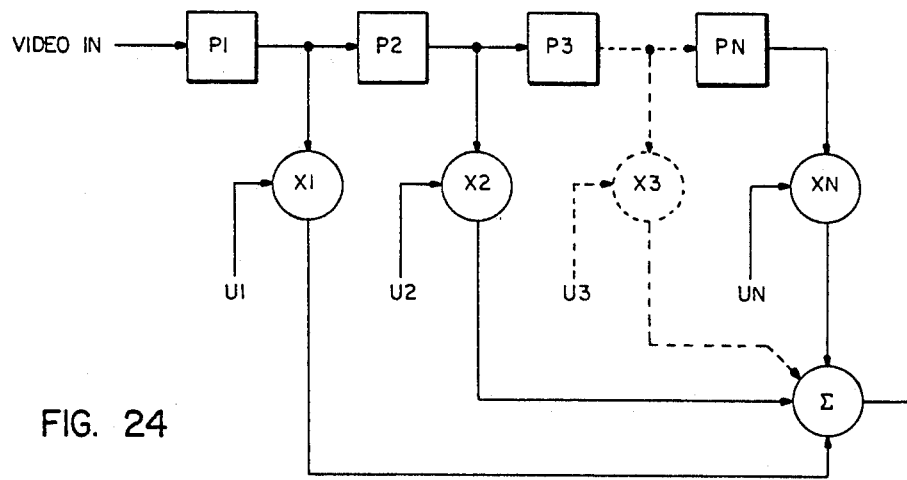
FIG. 24
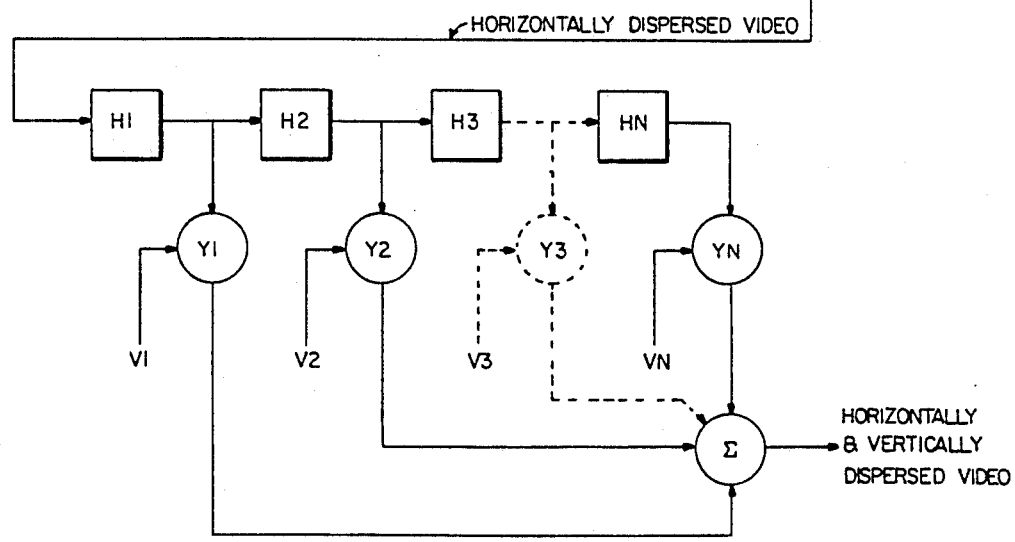

(PRIOR ART)

TV SIGNAL TRANSMISSION SYSTEMS AND METHODS

This application is a continuation of application Ser. No. 453,660, now abandoned, filed Dec. 20, 1989 which is a continuation-in-part of application Ser. No. 238,956, filed Aug. 31, 1988, now abandoned, which is a continuation-in-part of application Ser. No. 176,893, filed Apr. 4, 1988, now abandoned.

This application is related to application Ser. No. 239,155, filed Aug. 31, 1988, entitled HIGH DEFINITION TELEVISION SYSTEM, in the names of R. Citta and R. Lee, and assigned to Zenith Electronics Corporation, which application is incorporated by reference herein.

BACKGROUND OF THE INVENTION AND PRIOR ART

This invention relates generally to television signal transmission systems and methods and specifically concerns a novel television transmission system of improved noise performance. In an amplitude modulation (AM) implementation of the invention, the enhanced signal to noise ratio of the transmitted signal may be converted, in whole or in part, to a substantial reduction in transmission power without discernible degradation in signal fidelity. In its frequency modulation (FM) implementation, the reduced bandwidth of the transmitted signal enables much improved signal to noise performance. The preferred embodiment of the invention provides special benefits with regard to adjacent channel and co-channel interference problems with NTSC and other type television signal transmission and receiving systems. The improved transmission system permits operation in or adjacent to NTSC television signal transmission areas without objectionable adjacent channel and co-channel interference, either to or from the NTSC channel. In its FM implementation, the invention will find ready application in connection with Direct Broadcast Satellite (DBS) transmission systems. This use will result in receiving dish antennas of significantly smaller diameter and trigger a rapid expansion in growth of satellite television receivers.

An NTSC television signal occupies a 6 MHz bandwidth and imposes significant transmission power demands. These power demands are directly related to the cost of operating the signal transmitter and reductions therein can yield significant economic benefits. Also of great importance is the fact that cable television plants, especially those of older vintage, are restricted in the number of channels they can handle by the lo signal power handling capabilities of their amplifiers. It would be highly desirable to reduce the amount of signal power required to transmit television signals, thereby reducing transmitter operating costs and permitting a larger number of television channel signals to be handled by a cable plant of given power handling capability. The system of the invention achieves a marked reduction in the power required to transmit an AM television signal without discernible degradation of signal fidelity and therefore provides a solution to these needs of the prior art.

In its FM implementation, the system of the invention enables transmission with significantly less bandwidth since the deviation of the FM signal is minimized. The smaller bandwidth directly improves the signal to noise performance of the system, which improvement may be translated into smaller receiving antennas. Thus, the system of the invention will be seen to solve a longstanding problem in DBS transmission systems.

The inventive system has a number of important aspects. In accordance with a fundamental aspect of the invention, a television signal is configured such that the transmitted signal is a "hybrid," that is it has a coded (digital) portion, representing signal components of low picture detail and relatively high transmission power demand that may be transmitted in a relatively low power utilization format and an analog portion, representing signal components of high picture detail and relatively low transmission power demand. The demarcation between the analog and digital portions is a function in part of the availability of means to transmit the digital data. In accordance with the invention, the data is sent in non-active video portions of the transmitted signal.

The hybrid system is subdivided into a "basic hybrid," in which the removed and digitized low frequencies are under about 15 KHz and an "extended hybrid" in which the removed and digitized signal frequencies are under about 200 KHz. As will be explained in detail below, in the basic hybrid form of the invention, the digital part comprises video components below the line deflection frequency that are digitally coded and transmitted as data during non-active video portions of the television signal. In the extended hybrid form of the invention, the digital part comprises video components below about 200 KHz that are digitally coded and transmitted as data during non-active video portions of the television signal. Since the invention may be used with many different television signal formats, the non-active video portions of the signal may include either or both of the horizontal and vertical blanking intervals.

It has also been found that further benefits are obtained by sequentially applying basic hybrid processing and extended hybrid processing (referred to as two-step processing), with the basic hybrid processing being performed for the active video of each horizontal line such that the low frequency average of each horizontal line is removed from the analog signal. The remaining components below 200 KHz are subsequently removed.

Another aspect of the inventive system is the utilization of a 2.8 MHz double sideband AM suppressed carrier that is located in the center of the 6 MHz channel. This arrangement helps minimize adjacent channel interference from and to NTSC television signals and contributes to the ability to operate in the vicinity of other, normally restricted, television signals.

A further important aspect of the inventive system involves "temporal preemphasis," also referred to as temporal filtering, field processing or frame combing. With this approach, transmission power for stationary images is reduced while transmission power for moving images is increased. Since the average television picture is, relatively speaking, static, the use of temporal preemphasis is of benefit because the greater interference potential of the signal corresponding to moving images is outweighed by the fact that noise in a moving image is much less noticeable (visually) than noise in a stationary image. Temporal de-emphasis, of course, is applied in the receiver. This aspect of the invention has advantages in any "video" transmission system, independent of the hybrid processing of the signal. This is due to the fact that normally there is little change between successive frames of video and emphasizing the changes relative to the static portions results in very efficient transmission.

Yet another important aspect of the inventive system involves compressing the "hybrid" video signal to achieve a large signal to noise ratio for broad, flat video areas, where noise is readily discernible visually, and a low signal to noise ratio for narrow video components, representing edges and video detail, in which noise is much less visually discernible. In the receiver, the signal is expanded to undo the compression in the transmitter. The combination of compression and expansion is referred to as "companding".

Still another important aspect of the inventive system is the use of dispersal filtering to reduce the amplitudes of the peak video components by distributing their energy among the "voids" created in the hybrid video signal. As will be seen, these voids are the direct result of hybrid processing of the video signal whereby low frequency analog components are removed, coded and included as data in the non-active video portions of the remaining analog high frequency components. Dispersal filtering techniques for horizontally and vertically dispersing signals and for weighting the group delay characteristics of the dispersal filters to maximize the video appearance of the signal are also used.

As those skilled in the art will readily perceive, reduction of the average power of the transmitted signal is highly desirable, especially where adjacent channel and cochannel interferences are concerned. The reduction occurs because of the hybrid processing of the video signal which effectively replaces low frequency video signals with "doublets" that define the edges of the video image. With temporal filtering, the largest signals result from moving video edges which can be compressed even more. Companding increases the signal to noise performance for relatively stationary edges of video images at the expense of much less observable noise associated with moving video image edges. Dispersal filtering primarily reduces the amplitudes of the signals above the hybrid processing frequency range.

Other advantages flow from application of the various aspects of the inventive system that improve signal to noise performance, especially with respect to the ability to operate in an environment of adjacent and co-channel NTSC signals. One is the technique of precise carrier frequency offset with respect to co-channel NTSC signals to cause "break up" of interfering signals, and thereby reduce their visibility in the video display. Co-location, or locating the hybrid signal transmitter of the invention close to the adjacent channel NTSC transmitter, may be used to assure that receivers in both reception areas receive approximately equal strength signals to enable their respective AGC systems to set up properly. Frame locking the hybrid signal to the NTSC signal and incorporating all data in the vertical blanking interval of the hybrid signal contributes to the ability to operate in a co-channel environment. The lo present application is specifically directed to frame locking the hybrid signal to the NTSC signal so that the "visual effect" of the data in the hybrid signal vertical interval is minimized in the NTSC video display. It will, of course, be clear that the many aspects of the inventive system may have benefits that are independent of other aspects of the system, and that the use of one or more of the aspects in combination with each other produces even greater benefits.

OBJECTS OF THE INVENTION

A principal object of the invention is to provide novel television signal transmission systems and methods.

An additional object of the invention is to provide television signal transmission systems of improved noise performance.

A further object of the invention is to provide a novel AM television signal transmission system that requires substantially less transmitting power.

A still further object of the invention is to provide a novel FM television signal transmission system that requires substantially less bandwidth.

Another object of the invention is to provide a television transmission system that minimizes adjacent channel and co-channel interference.

Still another object of the invention is to provide an optimal television signal transmission system with better noise performance.

BRIEF DESCRIPTION OF THE DRAWINGS

These and other objects and advantages of the invention will be apparent upon reading the following description in conjunction with the drawings, in which:

FIGS. 17A-17D illustrate a temporal preemphasis filter and its response as used in the transmitter of FIG. 16;

FIGS. 18A-18D illustrate a temporal de-emphasis filter and its response as used in the receiver of FIG. 16;

FIG. 19 is the response characteristic of the compressor in the transmitter of FIG. 16;

FIG. 20 is the response characteristic of the expander in the receiver of FIG. 16;

FIGS. 21A-21D illustrate another form of temporal pre-emphasis filter and its response as used in the transmitter of FIG. 16;

FIGS. 22A-22D illustrate a companion temporal de-emphasis filter and its response as used in the receiver of FIG. 16;

FIG. 23 is a diagram showing a dispersal filter system for use in the transmitter of FIG. 16;

FIG. 24 is a dispersal filter system for use in the transmitter of FIG. 16 for horizontally and vertically dispersing the video signal;

DESCRIPTION OF THE PREFERRED EMBODIMENTS

Figure 1:
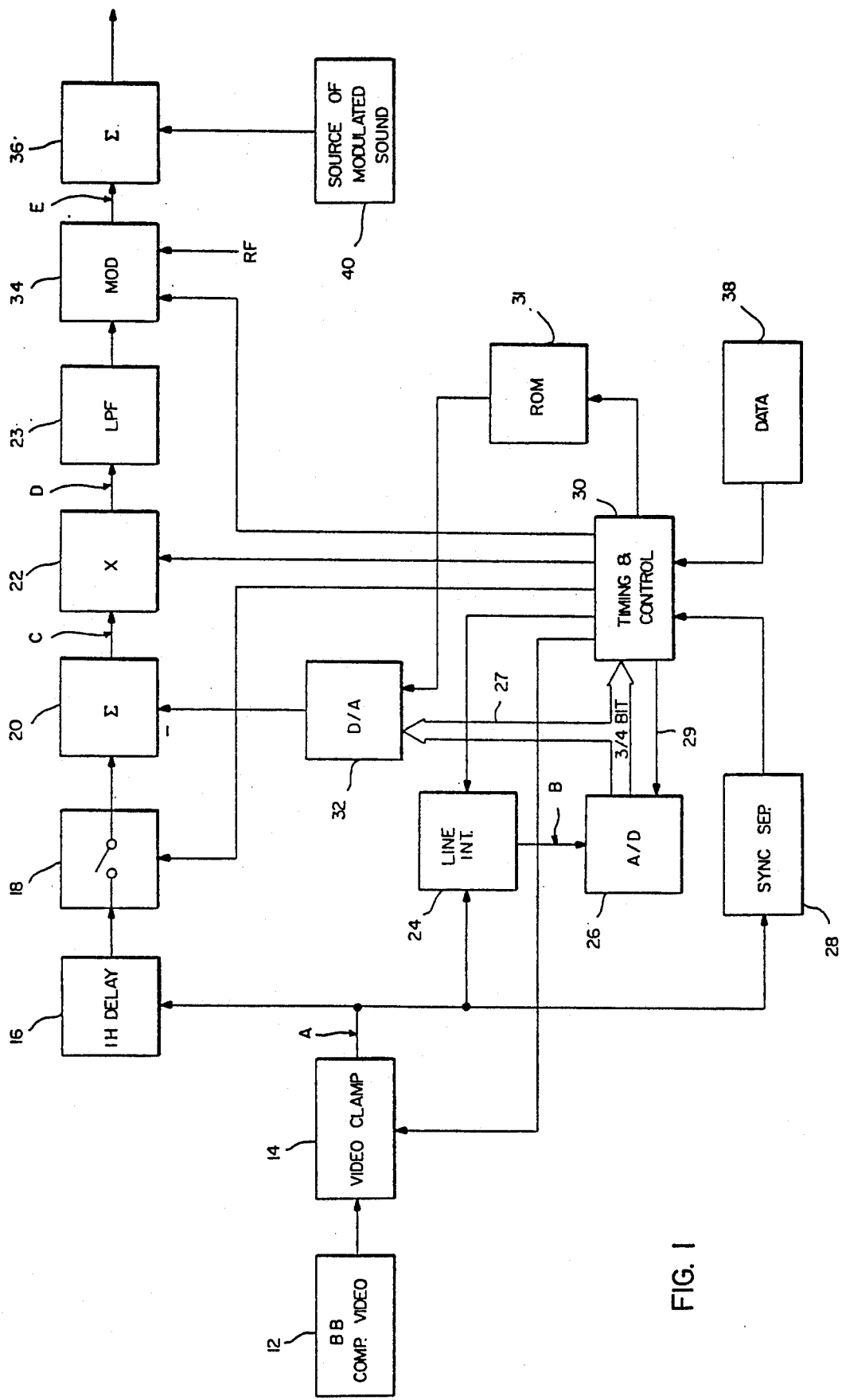
FIG. 1 is a block diagram of a basic hybrid television signal transmitter constructed in accordance with the invention.

The philosophy of the hybrid processing of the invention is to reduce the power required to transmit a television signal by extracting low frequency video analog components (that have a high transmission power requirement) therefrom and transmitting such components in a coded, low-powerconsumption form along with the remaining high frequency components that are transmitted in a conventional manner. As will be discussed, this results in a substantial reduction in the transmitter power required, which may be translated into better low frequency noise performance, since the transmission power demand is greatest for the low frequency components. In FM transmissions, the benefit is in the form of reduced bandwidth which also improves noise performance. Hence the hybrid television signal transmission systems of the invention have improved noise performance over prior art television systems.

More specifically, in the basic hybrid form of the invention, the baseband composite video signal is subjected to "line integration" at the transmitter to determine a line averaged value of the active video for each horizontal line. In an analog version of the transmitter, the line averaged value is passed through an analog-to-digital (A/D) converter where it is converted to a digital value which is coded and transmitted with the high frequency components of the video signal. These high frequency components are obtained by subtracting an analog signal that corresponds to the line averaged digital value of the active video portion of each horizontal line. To assure that the subtracted analog signal corresponds to the appropriate portions of the baseband video signal, the baseband composite video signal is subjected to a one horizontal line delay. The output of the line integrator may be subtracted directly from the baseband video signal to obtain the high frequency components. This approach could introduce error since the coded representation of that signal, which is used in the receiver to reconstitute the low frequency components, may have resolution limitations. Preferably, digital values, representing the line averaged video signals, are supplied to a digital-to-analog (D/A) converter for developing the analog signals (low frequency components), which are subtracted from the baseband video signal. This eliminates errors due to resolution limitations. Accurate reconstruction of the low frequency portions can now be accomplished in the receiver because each coded representation truly represents the subtracted low frequency portions for that line of video. In a digital version of the transmitter, the analog video signal is converted to a digital signal and a digital average of the active video portion of each horizontal line is obtained.

As will be seen with reference to the extended hybrid form of the invention, frequencies below about 200 KHz are removed and sent as coded data for even greater power reduction benefits and to yield co-channel interference benefits from temporal preemphasis, signal compression and dispersal.

Referring in greater detail to the drawings, in FIG. 1, a source 12 of baseband composite video signal supplies a video clamp circuit 14 in accordance with conventional techniques for establishing a base line reference, generally at blank level, i.e., corresponding to the level of the sync signal back porch. The output of video clamp 14 is supplied to a one horizontal line (1H) delay circuit 16, to a line integrator 24 and to a conventional sync separator circuit 28. The output of sync separator circuit 28 supplies sync pulses to a timing and control circuit 30. A data source 38 supplies information, in the form of data to be included in the transmitted television signal, to timing and control circuit 30. The delayed baseband composite video signal output from delay circuit 16 is passed through a switch 18 that is operated by timing and control circuit 30. The output of switch 18 is supplied to a summing network 20 which, in turn, supplies a multiplier circuit 22. Line integrator 24 is also coupled to, and operated under the control of, timing and control circuit 30 for integrating only the active video portion of each horizontal line of the baseband composite video signal. Its output is supplied to an A/D converter 26 which is coupled over a communication bus 27 to timing and control circuit 30. Communication bus 27 is also coupled to a digital-to-analog (D/A) converter 32. A control line 29 links A/D converter 26 and timing and control circuit 30. A ROM 31 is coupled between timing and control circuit 30 and D/A converter 32. ROM 31 supplies certain fixed reference and identification signals to D/A converter 32 as will be explained.

The output of multiplier 22 is coupled to a low pass filter (LPF) 23 to conform the data pulses to channel bandwidth limitations. LPF 23 feeds a modulator 34 which, along with multiplier 22, is under control of timing and control circuit 30. Modulator 34 is also supplied with an RF carrier and, in turn, supplies a summing network 36 that combines an audio signal from a source of modulated sound 40 with the modulated video signal of the invention for transmission to suitable receivers. Modulator 34 may either be an AM or FM modulator, with the FIG. 1 implementation being for #-,he AM version. For an FM version, sound source 40 need only be interposed between LPF 23 and modulator 34.

In operation, timing and control circuit 30, under control of the sync signals from sync separator 28, sends appropriate timing signals to video clamp 14, line integrator 24, switch 18, multiplier 22, modulator 34, A/D converter 26, D/A converter 32 and ROM 31. The video clamp 14 maintains the sync signal back porch of the composite baseband video signal at a predetermined level. The line integrator 24 is operated to independently integrate only the active video signal portion of each horizontal line. Switch 18 is operated by timing and control circuit 30 to pass active video and color burst, but not horizontal sync, if present, to summing circuit 20. The line averaged value of video developed by line integrator 24 for a particular video line is digitized by A/D converter 26 and coupled to both timing and control circuit 30 and D/A converter 32. D/A 32 converts the output of A/D 26 to a corresponding analog signal which is subtracted from active video in summing network 20. During the horizontal sync signal portion of the composite video signal, ROM 31, in response to timing and control circuit 30, couples a digital pedestal signal to D/A 32, which is converted to a corresponding analog pedestal signal and inserted into the signal developed in summing network 20. It will be appreciated that some video signal formats may not have horizontal syncs or blanking intervals between successive horizontal lines.

Timing and control circuit 30 develops a data signal comprising positive and negative voltage data pulses representing the digitized line averaged signals from A/D 26 and applies these data pulses, during the horizontal blanking intervals, to multiplier 22. Multiplier 22 multiplies these data pulses with the analog pedestal signal previously inserted in the horizontal blanking interval to develop positive and negative data pulses during the horizontal blanking interval of the signal. As will be discussed below, the resultant coded representations of the line averaged signals are used to reconstitute the signal in the receiver.

While the number of data pulses that may be inserted in the horizontal blanking interval is dependent upon the data frequency, the inventive system envisions that other coded data may be included in the horizontal blanking interval if desired, specifically data from data source 38. While the coded representation of the digital output of A/D converter 26 for each video line preferably comprises three or four bits ($\frac{3}{4}$), more bits can be used depending upon the resolution desired. To assure accuracy of the reconstituted signal in the receiver, this line varying $\frac{3}{4}$ bit digital signal, which represents high (transmission) energy, low frequency components of the video signal, is passed through D/A converter 32 to form an analog signal that is subtracted from the composite baseband video signal. Due to the resolution limitations of the $\frac{3}{4}$ bit signal, a small residue of low frequency components may remain in the analog video signal that is passed by summing network 20 to multiplier 22. However, since the low frequency video component added to the high frequency video component is derived from the same $\frac{3}{4}$ bit signal, it will precisely match that which was subtracted at the transmitter.

Figure 2:
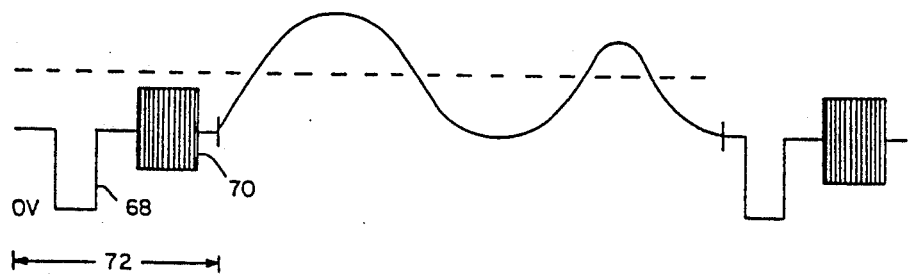
FIGS. 2A-2E are a series of waveforms useful in explaining the invention illustrated in FIG. 1.

In FIG. 2, the series of idealized, not-to-scale waveforms labelled A, B, C, D and E correspond to those appearing at correspondingly labelled portions of FIG. 1. Waveform A represents the baseband composite video signal with negative-going 15.75 KHz horizontal sync pulses 68, a 3.58 MHz color burst 70 and a horizontal blanking interval 72. Waveform B is indicated as a dashed horizontal straight line and represents the output of line integrator 24 which corresponds to the average level of the active video signal between successive horizontal blanking intervals 72. Waveform C represents the result of the subtraction of the line averaged video from the composite video signal and is centered at zero volts. It also includes the data pedestal added in summing network 20. Waveform D illustrates the result of multiplier 22 multiplying data with the data pedestal to develop positive and negative data pulses during the horizontal blanking period. While only two such pulses are shown for simplicity, a greater number of pulses is contemplated. Modulator 34 modulates an RF television frequency carrier with the bandwidth limited video signal, including the data pulses, for transmission as illustrated by waveform E. The signal is centered about zero carrier and reverses phase each time the envelope passes through the zero carrier level. Thus, for example, each half cycle of the color burst, as well as each data pulse, reverses phase. Portions 74 and 76 of the waveform represent RF carrier phase reversals in the video signal.

Figure 3:
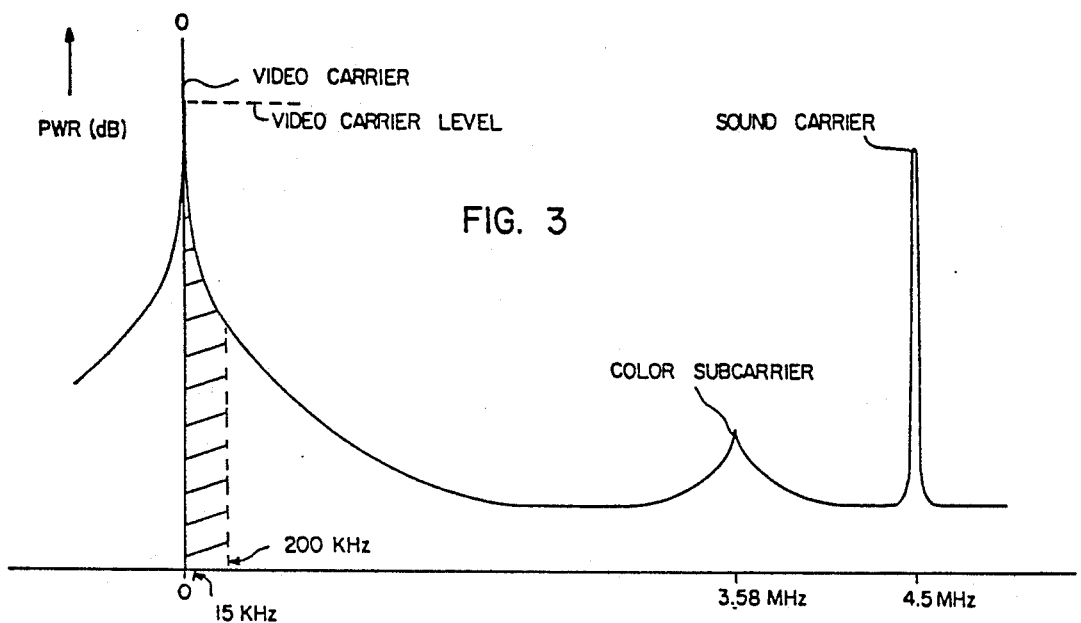
FIGS. 3 and 4 are graphs of power distribution of a typical AM modulated television signal.
Figure 4:
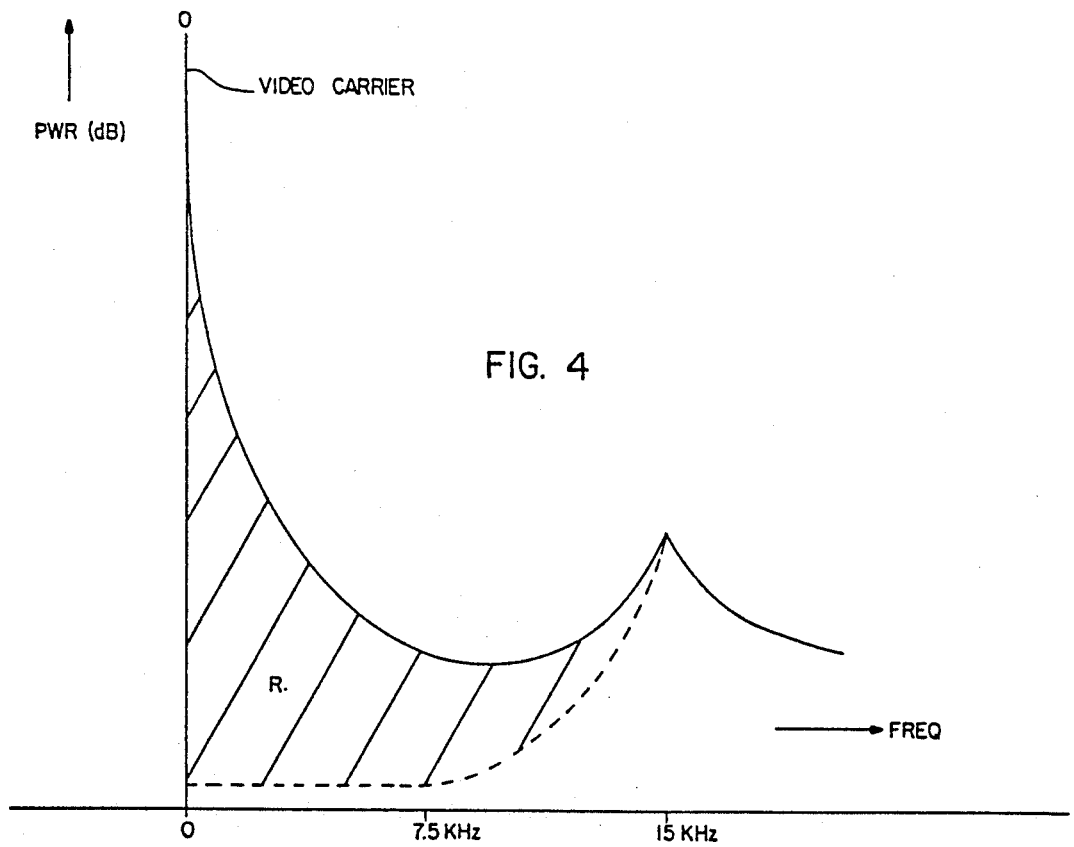

Referring to FIG. 3, an idealized representative spectrum of power distribution of an NTSC type television signal indicates the very significant power demand on the transmitter near the carrier frequency. FIG. 4 shows a very greatly expanded portion of the curve of FIG. 3 near the video carrier frequency. In particular the portion of the spectrum between the video carrier frequency and 15 KHz is illustrated. The shaded area bounded by the waveform and the dashed line pictorially illustrates the power saved with the basic hybrid form of the invention because of the subtraction of the low frequency signal components (below 15 KHz) from the transmitted signal. These low frequency components are instead transmitted in the form of data in a coded low-energy utilization format as explained above. This shaded area is estimated to represent approximately 99% of the power of a typical television signal. A reduction in transmitted power of 20dB (100:1) is thus well within that which is contemplated by the invention. Some of this power reduction may, of course, be sacrificed as a tradeoff to improve the signal-to-noise ratio of the transmitted signal. It should be borne in mind that since the power scales of the curves are logarithmic, they do not graphically convey the true magnitude of power reduction obtained with the invention.

A shaded area between 0 and 200 KHz on FIG. 3 will be discussed later in connection with the extended hybrid form of the invention in which analog components up to about 200 KHz are removed. While the additional transmission power savings from removing components below 200 KHz is not nearly of the magnitude as with the basic hybrid, the benefits obtained in compressing and dispersal of the peak video signals produced are very significant. It should also be pointed out that the coded data need not be put in the horizontal intervals of the transmitted signal, but may advantageously be transmitted in the vertical blanking intervals of the transmitted television signal. Indeed, as fully disclosed in the copending application above, the transmitted video signal need not have horizontal blanking intervals, or even horizontal sync signals. In general, the data may be placed in any non-active video portion of the television signal for optimum noise performance.

Figure 5:
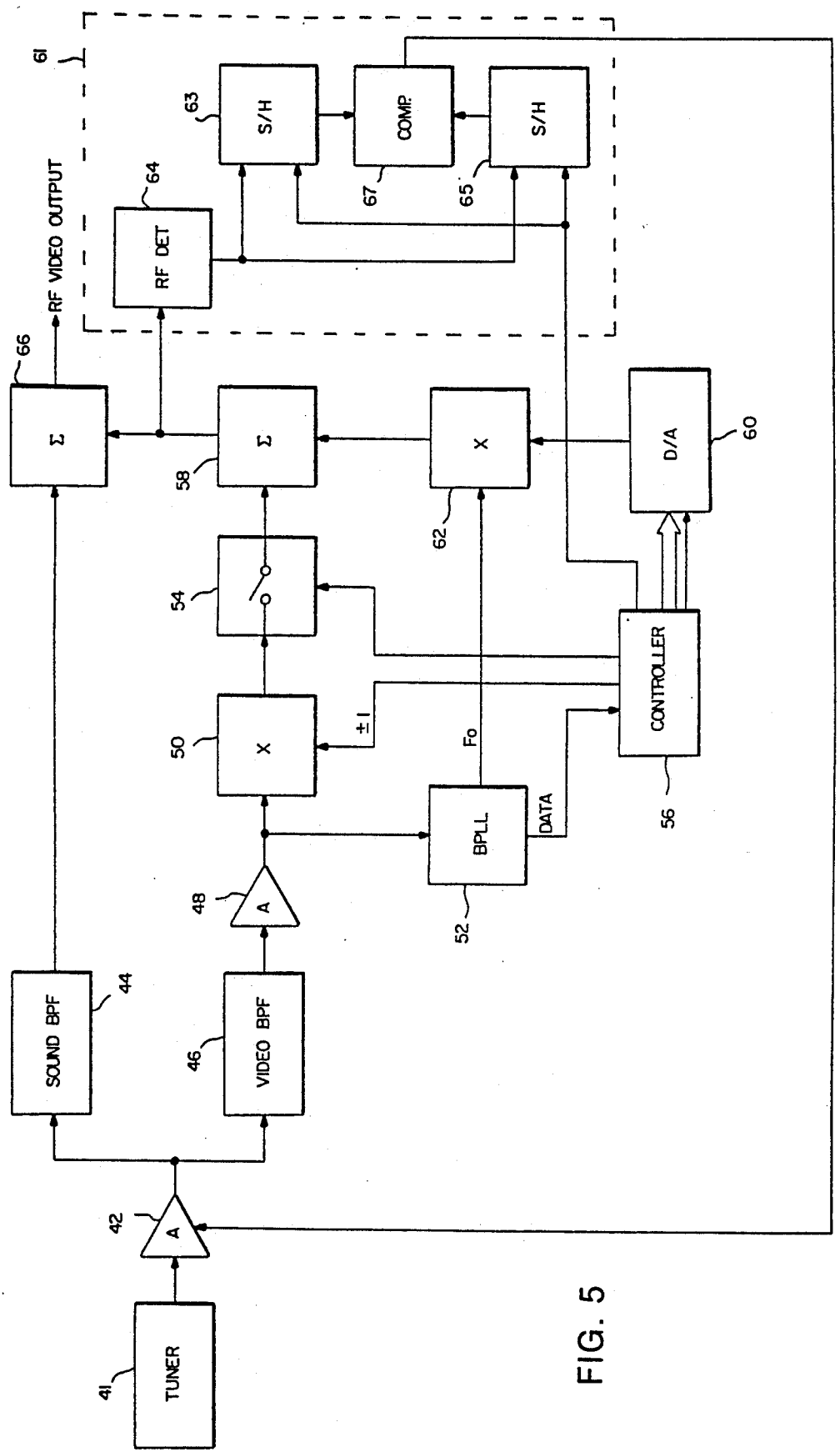
FIG. 5 is a block diagram of a basic hybrid television receiver constructed in accordance with the invention and operating at RF frequencies.

In the receiver of FIG. 5, the basic hybrid form of transmitted signal is received by a tuner 41 and supplied to a buffer amplifier 42. The output of amplifier 42 supplies a sound carrier bandpass filter 44 and a video carrier bandpass filter 46. The receiver operates at RF frequencies, although operation at IF and baseband frequencies are also contemplated. The output of sound bandpass filter 44 is supplied to one input of a summing network 66. The output of video bandpass filter 46 is supplied to a buffer amplifier 48. Buffer amplifier 48 feeds a multiplier 50 and a biphase stable phase locked loop (BPLL) circuit 52. The output of multiplier 50 is supplied through a switch 54 to a summing network 58. The data output of BPLL 52 is supplied to a controller 56 which, in turn, controls operation of multiplier 50 and switch 54. Controller 56 also supplies data, including the coded representation of the line averaged video, to a D/A converter 60. In the preferred embodiment, BPLL 52 is biphase stable and operates to provide recovered data, including the coded representation of line averaged video, to controller 56 and a fixed amplitude carrier Fo, that is either in phase or 180° out of phase with the received signal, to a multiplier 62. BPLL 52 may advantageously be constructed in accordance with the teachings of U.S. Pat. No. 4,755,762, issued Jul. 5, 1988, entitled COMBINED FPLL AND PSK DATA DETECTOR, in the names of R. Citta and G. Sgrignoli, and assigned to Zenith Electronics Corporation. That patent cites U.S. Pat. Nos. 4,072,909, issued Feb. 7, 1978, and 4,091,410, issued May 23, 1978, both in the name of R. Citta, as examples of biphase stable loops. These patents are incorporated herein by reference.

The received signal at the output of amplifier 48 is either in phase with, or 180° out of phase with, Fo. A special identification signal, (to be discussed in further detail hereinafter) inserted at the encoder by ROM 31 (FIG. 1) into the vertical interval of the television signal, is also recovered as part of the data and is interpreted by the controller to determine whether the phase of the received signal should be reversed to establish the correct phase relationship. Multiplier 50, under control of controller 56, multiplies the signal at the output of amplifier 48 by either +1 or −1 to assure the correct phase relationship with Fo. Those skilled in the art will recognize that, alternatively, the phase of Fo may be controlled by appropriate multiplication rather than by controlling the phase of the received signal as described. In either case, after any necessary corrections, Fo and the received signal will have the same phase. It will of course be appreciated by those skilled in the art that any other well-known technique may be used in place of that discussed for determining the correct phase of Fo.

Controller 56 develops a number of clock or timing signals from the received color burst in a well-known manner. It will be recalled that the color burst of the encoded signal changes RF carrier phase every half cycle thereby providing a conveniently detectable timing reference. These signals include a high frequency clock locked to the color burst and a horizontal rate clock derived by counting down therefrom. A low frequency clock is developed from an identification signal, to be described. Data is removed from the incoming signal by opening switch 54 during time periods corresponding to the occurrence of data. Sync information, i.e., a sync pulse and pedestal, is regenerated in the controller and applied via D/A 60 and multiplier 62 to summing network 58.

Multiplier 62 multiplies Fo with the output of D/A converter 60 to produce a carrier signal, the amplitude of which is determined by the coded representation of the line averaged low frequency video, for addition to the received video signal supplied to summing network 58. The output of summing network 58 is therefore the reconstituted video portion of the television signal. This signal is supplied to a special AGC circuit 61 and to summing network 66 where it is recombined with the sound modulated carrier and passed to conventional television signal processing circuitry (not shown). The output of AGC circuit 61 controls the gain of amplifier 42 to assure that the analog value of the digital representation of the line averaged video at the receiver matches that in the transmitter since the digital data is not altered by transmission attenuation as are analog portions of the signal.

The special AGC circuit 61 includes an RF detector 64, a pair of sample and hold (S/H) circuits 63 and 65 and a comparator 67. As will be explained, a reference signal is transmitted and portions thereof are sampled in the receiver to determine attenuation effects on the analog portions of the signal and to compensate the receiver gain accordingly.

Figure 6:
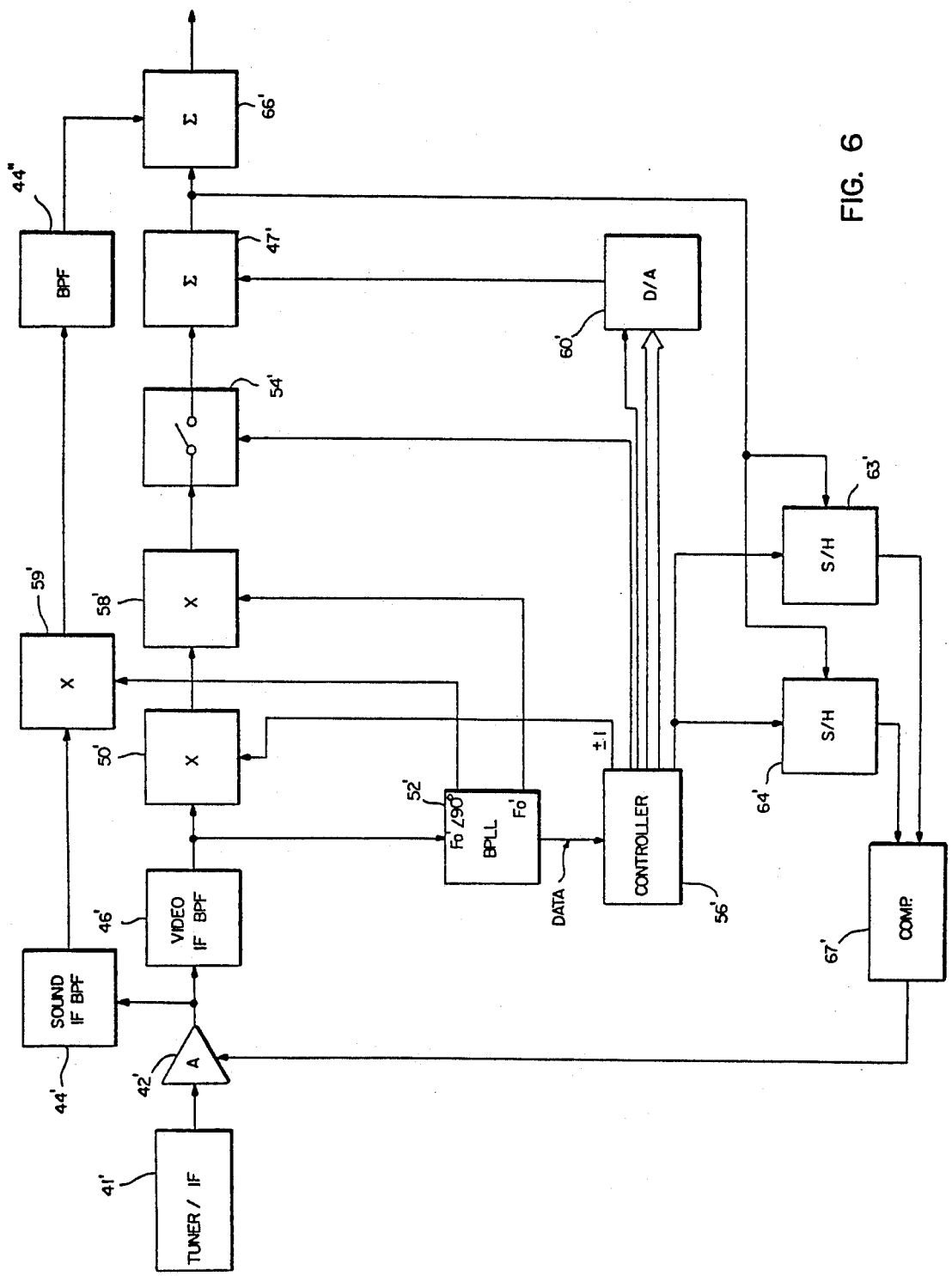
FIG. 6 is a block diagram of a basic hybrid television receiver constructed in accordance with the invention and operating at baseband frequencies.

While the receiver of FIG. 5 operates at RF frequencies, in many installations it is desirable that the receiver operate at baseband frequencies and FIG. 6 illustrates such a receiver. A tuner/IF 41' receives the transmitted signal and applies an IF signal through an amplifier 42' to a video IF bandpass filter 46' and to a sound IF bandpass filter 44'. Filter 46', in turn, supplies the IF signal to a BPLL 52' and to a multiplier 50'. Data is removed by BPLL 52' and applied to a controller 56'. BPLL 52' also recovers a pair of quadraturerelated IF carriers Fo' and Fo' 90°, Fo' being applied to a multiplier 58' and Fo' 90° to a multiplier 59'. Controller 56' determines on the basis of a received reference signal whether the phases of the received signal and Fo' are the same and controls multiplier 50' to reverse the phase of the signal, if necessary, by multiplying by a +1 or by a −1. Multipliers 58' and 59' function as synchronous detectors for developing output baseband video and 4.5 MHz sound signals, respectively, in response to Fo' and Fo' 90°. The 4.5 MHz sound signal is applied to a 4.5 MHz sound BPF 44'' and the composite video signal is applied to a switch 54'. Switch 54' is operated by controller 56' to open during data and horizontal sync portions of the received signal. A D/A 60' is operated by controller 56' and supplies one input of a summing network 47', the other input being supplied by switch 54'. D/A 60' supplies the sync and sync pedestal to summing network 47' along with an analog signal corresponding to the coded representation of the low frequency components sent in the data recovered by BPLL 52', which are added to the baseband video signal developed at the output of switch 54'. A reconstituted baseband video signal therefore appears at the output of summing network 47' and is applied directly to a pair of S/H circuits 63' and 64', which are operated under control of controller 56' to sample the reference signal that is transmitted to determine the attenuation effects on the analog portions of the transmitted signals. Again a comparator 67' supplies any correction required to adjust the gain of amplifier 42' to match the analog signal portions with the digital representations. The reconstituted video signal is also combined with the 4.5 MHz audio signal in a summing network 66' to provide an output baseband television signal which may be applied to a television monitor or the like for viewing.

Figure 7:
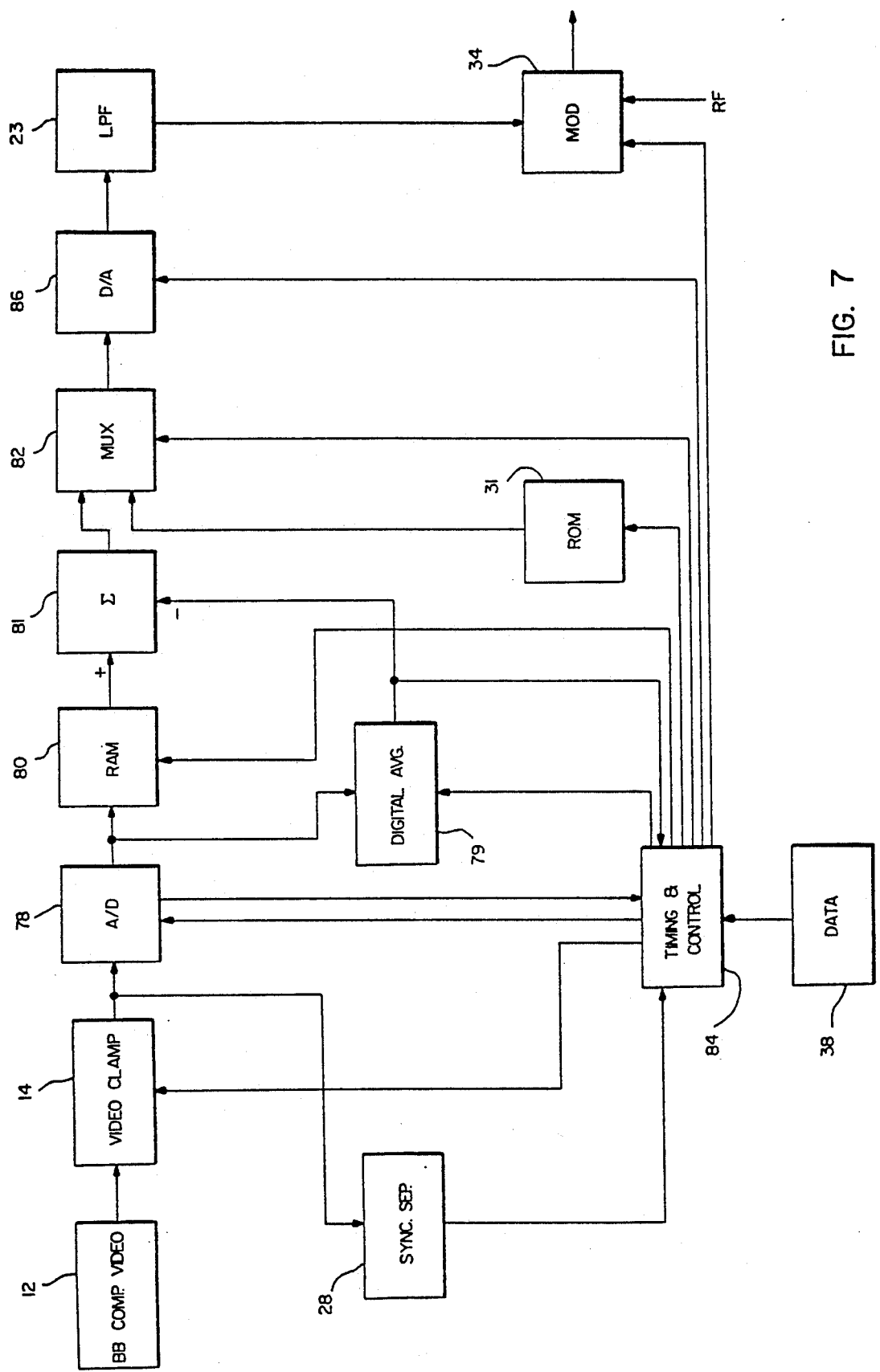
FIG. 7 is a digital implementation of a basic hybrid transmitter constructed in accordance with the invention.

Referring to FIG. 7, a digital implementation of a transmitter constructed in accordance with the basic hybrid form of the invention is shown. A baseband source of composite video signal 12 is coupled to video clamp 14, the output of which supplies an A/D converter 78 and a sync separator circuit 28. A timing and control circuit 84 is intercoupled with A/D converter 78 and is supplied with the output of sync separator 28. Video clamp 14 is operated under control of timing and control circuit 84 to clamp the incoming video signal at the back porch level. The source of data 38 is coupled to the timing and control circuit 84. The output of A/D converter 78 is supplied to a digital averaging circuit 79 and to a RAM memory 80. Digital averaging circuit 79 is operated under control of timing and control circuit 84 to sample the output of A/D converter 78 during the active video portions of the signal and to develop an average of the digital values for each individual horizontal line. This value is supplied back to timing and control circuit 84 and to a summing network 81 which is also supplied with the output of RAM memory 80. RAM memory 80 comprises a two video line memory in which one video line is written in as the previous video line is read out. This arrangement introduces a one line delay to assure that the digital average signal is subtracted from the video samples of the appropriate horizontal line. The output of summing network 81 is supplied to a multiplexing circuit 82 which is also coupled to the output of a ROM 31. ROM 31 supplies the reference and identification signals to the multiplexer 82 as will be described further below. Data from data source 38 and timing and control circuit 84 is applied to a third input of a multiplexer 2 during the horizontal blanking intervals of the signal. The data includes a coded representation of the line averaged values developed by digital averaging circuit 79. The output of multiplexer 82 is coupled to a D/A converter 86 whose output is supplied to a low pass channel filter 23 and thence to a modulator 34. Summing network 81, multiplexer 82, D/A converter 86 and modulator 34 are all operated under control of timing and control circuit 84. Modulator 34 is supplied with an RF signal and its output is further processed as indicated in FIG. 1.

Referring back to FIG. 2, it will be seen that the waveform C is obtained by subtracting waveform B from waveform A during the active video portions of each horizontal line, except during the horizontal blanking interval 72. It will be appreciated by those skilled in the art that a similar result would be obtained by adding a waveform of magnitude B to the horizontal blanking interval only and correcting for the resulting change in zero level. When considering the digital implementation of the encoder, the latter technique involves considerable simplification and is the presently preferred method of implementation for this version of the invention.

In FIG. 7, the output of the A/D converter 78 preferably comprises approximately 910 samples per horizontal line with about 752 of those samples representing the active video portion of the line. Each sample is represented by either 8 or 10 bits depending upon the output resolution desired. For example, for ordinary commercial type television signals, an 8 bit resolution is sufficient, whereas for studio level quality and transmission applications, a 10 bit resolution is preferred. The number of bits selected for the active video portion is preferably divisible by 2 which greatly simplifies the hardware. As alluded to previously with respect to FIG. 2, it may be preferable to add the line averaged value (waveform B) to the horizontal blanking interval of the signal rather than to subtract the line averaged value from the active video portion. This would entail approximately 60 additions as compared with approximately 752 subtractions and would again materially simplify the operation and hardware. However, the result would be the sam--, after correction for the zero level, and the particular technique utilized should not be considered limiting of the invention. The digitally processed signal is then supplied from the summing network 81 to the multiplexer 82 along with data from timing and control circuit 84 and the fixed identification and reference signals from ROM 31. After passage through D/A converter 86, the signal is handled in the same manner as described with respect to the transmitter of FIG. 1.

Because of the nature of the transmitted television signal, that is, a mixture or hybrid of analog and coded digital information, a system for compensating for transmission attenuation experienced by the analog signal (which does not alter the digital data) is provided. In order to properly reconstruct the received signal, the analog video signal may need to be adjusted to maintain the same relationship, between it and the digital data, that existed at the transmitter. The invention provides for sending a reference signal with a known relationship between the analog and digital data, detecting that signal in the decoder and comparing the detected levels to determine the amount and polarity of adjustment required, if any.

Figure 8A:
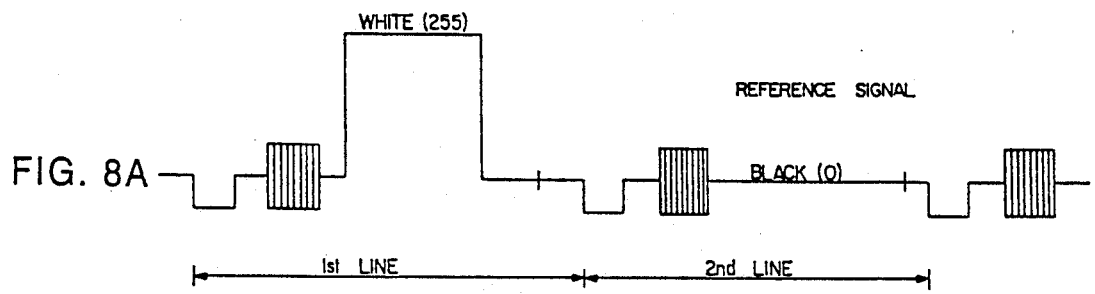
FIGS. 8A-8C are a series of waveforms explaining a novel signal level compensator for use with the hybrid aspect of the invention.
Figure 8B:
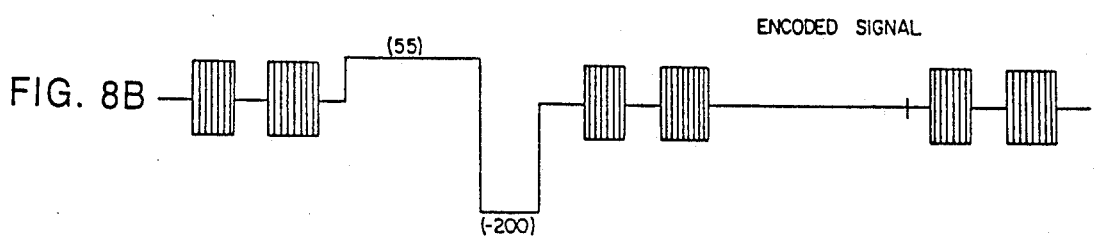
Figure 8C:
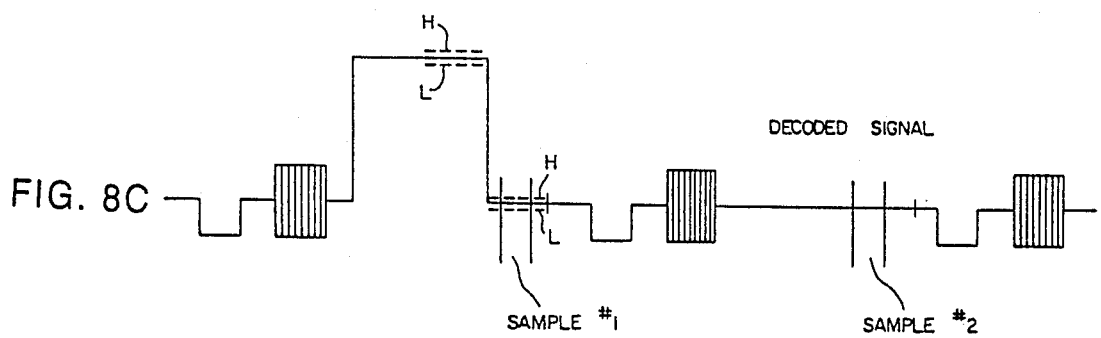

Referring to FIG. 8, waveforms A, B and C, depicting two horizontal lines of a transmitted signal are shown. Waveform A constitutes a reference signal which comprises a white line (indicated as digital level 255) that falls to zero or black level (indicated as 0) followed by a second line of no video or black level. Waveform B represents an encoded counterpart of the reference signal (A) in which the white line has been reduced to a digital level of 55 by subtraction of an assumed average level of 200. The black level portion of the video line now occupies a level of −200, reflecting the subtraction of the average level of 200 therefrom. The second line, however, is unchanged in the active video portion since its average level is zero. Waveform C represents the decoded (reconstituted) signal and also indicates two sample areas identified as sample #1 and sample #2. Samples of the levels are taken at the indicated areas and stored in the sample and hold circuits of the receiver. Under conditions where the analog signal does not experience attenuation, sample #1 will reflect that the signal level has been returned precisely to zero level and will match sample #2. Should the decoded (reconstituted) signal be higher, as indicated by the dashed line portion H, sample #1 will be greater than sample #2 and the output of comparators (67 in FIG. 5 and 67′ in FIG. 6) will generate a correction voltage for application to amplifier 42 or 42′. If, on the other hand, the decoded signal is at a lower level L, sample #1 will be less than sample #2 and an opposite type correction will be supplied from the comparator to the amplifier. The provision of this reference signal, including one horizontal line with a significant analog video portion and a subsequent line with a zero analog video portion, provides a built-in standard for determining how transmission and processing has affected the analog signal.

Figure 9:
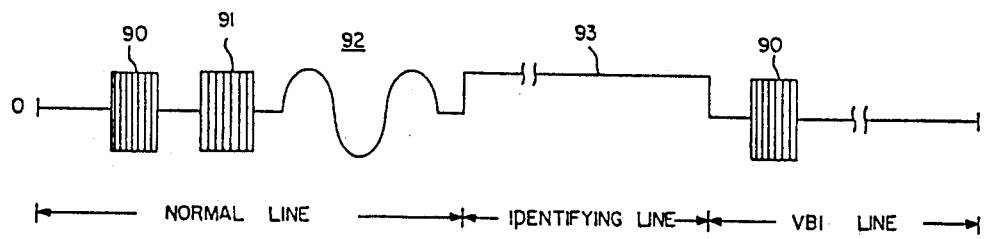
FIG. 9 illustrates a form of identification signal useful with the hybrid aspect of the invention.

In FIG. 9, one form of identification signal is shown that serves the dual purpose of providing a start signal for timing purposes and for identifying the proper phase relationship between the video carrier signal and Fo. A normal encoded line (shown not-to-scale) includes data, horizontal pulses 90, a color burst 91 and an active video portion 92, which assures a certain number of zero crossings. Detection is based upon no zero crossings occurring during a line. An identification line is established without zero crossings by removing data pulses and color burst. The polarity of the video signal 93 may be used to indicate a particular phase relationship between the video carrier and the recovered Fo signal. The next line, assumed to be in the vertical blanking interval, does not have color burst, but does have data pulses. Thus, it too exhibits zero crossings. It will be appreciated that this illustration is but one of many arrangements that may be used for an identification signal.

Figure 10:
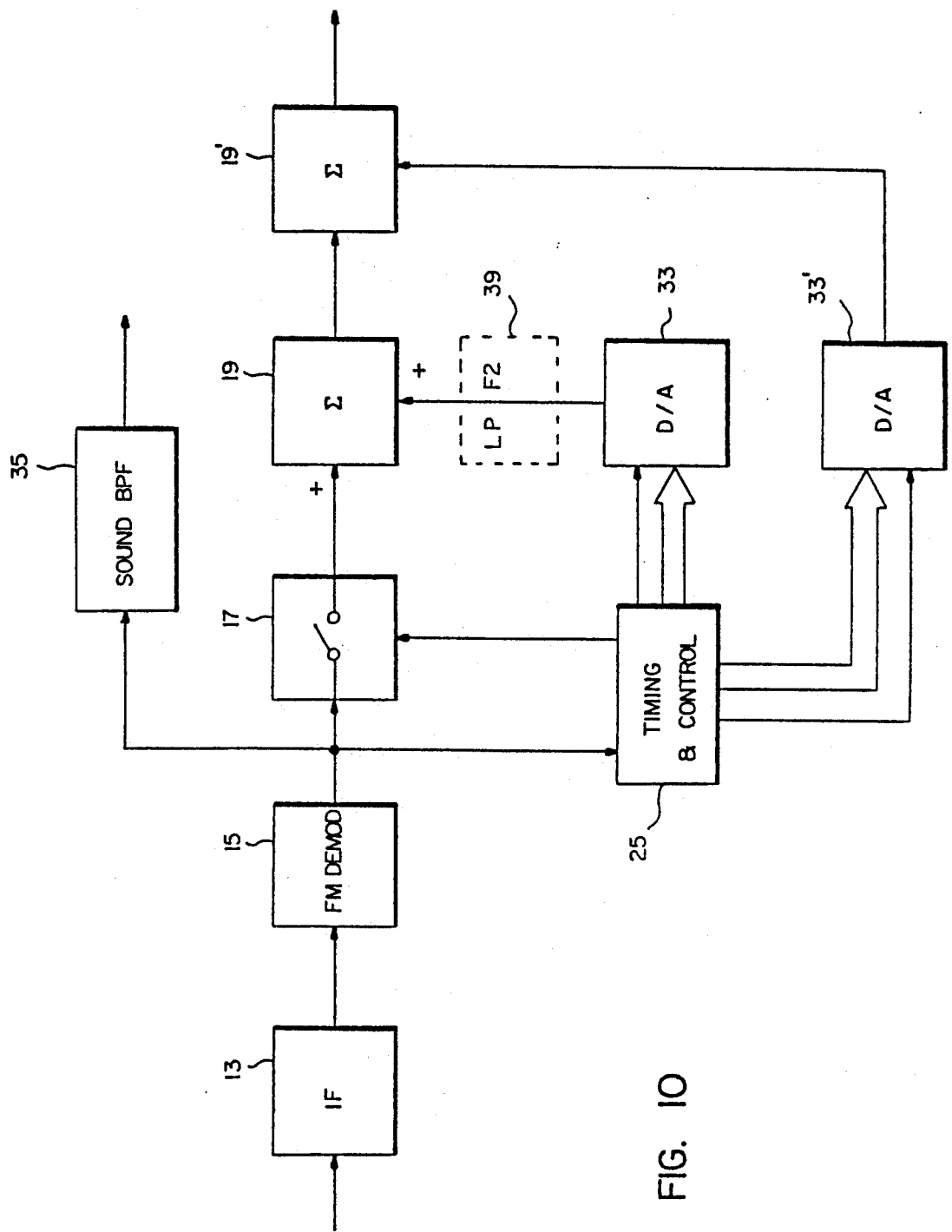
FIG. 10 is a block diagram of a receiver for processing a hybrid FM modulated transmitted signal.

In FIG. 10, a receiver for receiving a basic hybrid processed FM television signal is shown. The signal received by IF 13 is supplied to a conventional FM demodulator 15 which in turn is coupled to a switch 17, a timing and control circuit 25 and a sound bandpass filter 35. Timing and control circuit 25 receives data from demodulator 15 and controls operation of switch 17 as well as supplying the coded data information to a D/A converter 33. The sync signal information is used to develop timing signals which are supplied to a D/A 33'. The output of switch 17 feeds a summing circuit 19 as does the output of D/A converter 33. The output of summing circuit 19 is supplied to another summing circuit 19' which is also supplied with the timing signals from D/A 33'.

The dashed line block 39 labelled LPF 2 is not used in the basic hybrid FM receiver, but is used in conjunction with an extended hybrid receiver for receiving an extended hybrid processed signal as discussed below.

The basic hybrid processing circuit described removes low frequency analog video signal components (below the horizontal line frequency) by subtracting the line averaged value of these components from the analog signal. This will be recognized as a specific example of a more general hybrid approach to television signal processing in which the video signal is divided into low frequency and high frequency components. It will be noted that the low frequency video components (under 15 KHz) account for the vast majority of transmission power required and that the removal of additional analog video components (under about 200 KHz) does not result in significant additional transmission power savings. However, extended hybrid processing does yield highly beneficial results in terms of developing a television signal of improved signal to noise performance and having minimum co-channel and adjacent channel interference potential with respect to NTSC signals. Thus, in the extended hybrid processing system of the invention, video signal components below about 200 KHz are removed, converted into digital form and coded data representative of the removed components is sent in a non-active video interval of the analog signal.

Figure 11:
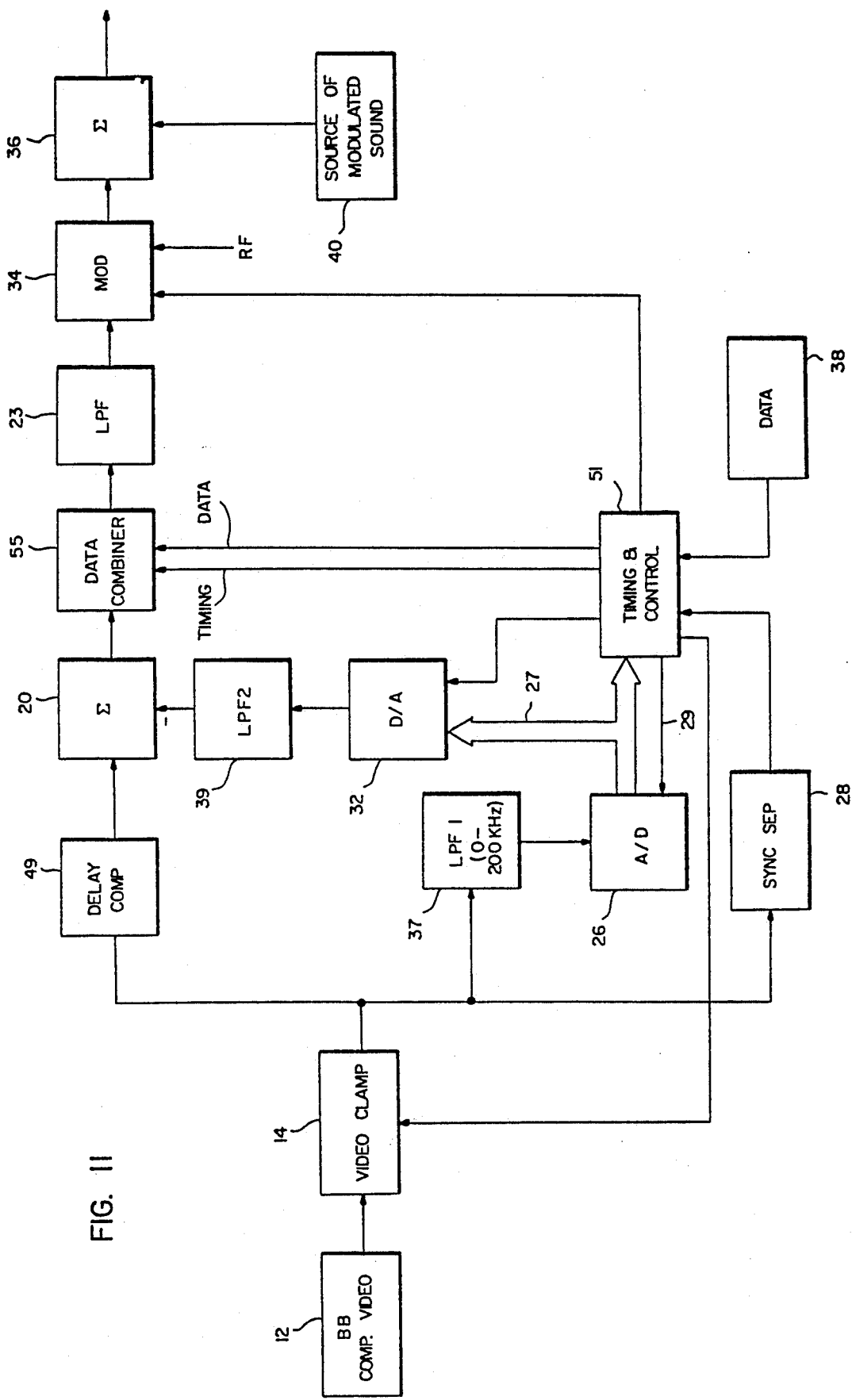
FIG. 11 is a block diagram of an extended hybrid television signal transmitter constructed in accordance with the invention.

In the extended hybrid transmitter of FIG. 11, the output of video clamp 14 is supplied to a delay compensation network 49, which in turn is coupled to a summing circuit 20. The video signal is also supplied to sync separator 28 and to a low pass filter (LPF 1) 37. The filter 37 is indicated as passing frequencies up to about 200 KHz. The output of filter 37 is supplied to A/D converter 26 which in turn supplies D/A converter 32, the output of which is coupled to a filter 39 (LPF 2) and to a timing and control circuit 51. The output of filter 39 is subtracted from the full analog video signal in summing circuit 20. A data combiner 55 receives the output of summing circuit 20 and data and timing signals from a timing and control circuit 51. The remainder of the circuit is substantially the same as that of FIG. 1 and operation is essentially the same. Filter 39 is not required if a full resolution digital coded representation is used. In most instances, however, the number of bits from A/D converter 26 will be limited, thus limiting the resolution, and filter 39 is included to assure that the transmitted signal will match that produced in the receiver.

Figure 12A:
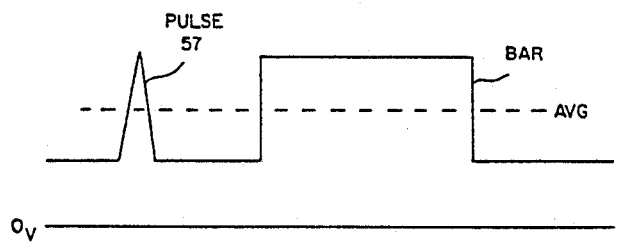
FIGS. 12A-12C are sets of waveforms useful in understanding the hybrid processing of the invention.
Figure 12B:
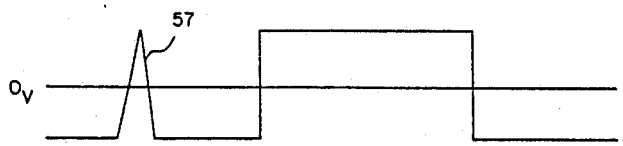
Figure 12C:
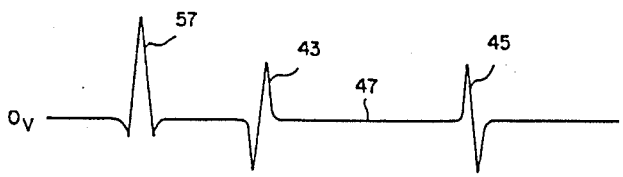
Figure 13A:
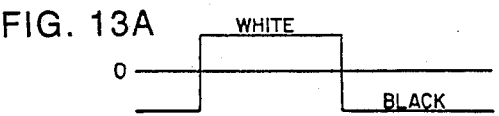
FIGS. 13A-13D are a series of waveforms illustrating the FM bandwidth for different types of signal processing.
Figure 13B:
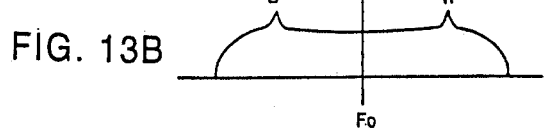
Figure 13C:
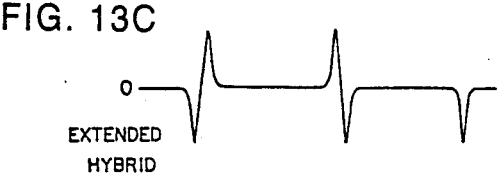
Figure 13D:
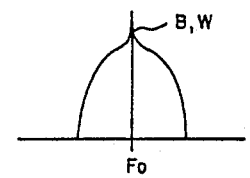

In FIG. 12, the effects of basic hybrid and extended hybrid processing on an idealized video signal consisting of a pulse and a bar are illustrated. Curve A represents the video signal having a relatively sharp pulse followed by a fairly broad bar. As shown, the average signal level is significantly above 0 volts. Curve B illustrates a pulse 57 and a bar signal when it is subjected to basic hybrid signal processing in accordance with the invention. It will be seen that the average signal level has been subtracted, thus reducing the overall magnitude of the signal. Curve C shows the signal after extended hybrid processing in accordance with the invention. Here it is seen that only high frequency signals, such as doublets 43 and 45 and pulse 57, which correspond to video edges and video detail, remain since the low frequency components, up to about 200 KHz, have been removed. In particular, extended hybrid processing produces a significant number of voids, such as that indicated at 47, in the transmitted analog signal. As will be discussed below, the voids are extremely useful for reducing the peaks in the remaining transmitted analog signal by the techniques of compression and dispersal filtering. As is well known, peak signals are of greatest importance when dealing with co-channel and adjacent channel interference problems.

FIG. 13 illustrates the effects of hybrid processing of a square wave video signal on FM transmission bandwidth. Curve A illustrates a basic hybrid processed signal corresponding to a horizontal line of a one-half white and one-half black screen. Waveform B illustrates the transmission bandwidth centered about a carrier frequency Fo for the signal. In the extended hybrid processed waveform illustrated by curve C, only signal spikes in the form of doublets remain and the bandwidth shown by curve D is very much narrower, with the frequency deviation due to the black and white level signals, folding onto each other at the center frequency Fo since they each correspond to a zero volt signal. The extended hybrid signal FM transmission bandwidth is thus seen to be very much smaller than the bandwidth corresponding to the basic hybrid processed signal. This FM transmission bandwidth reduction translates into significantly improved noise performance in the FM channel and is an outstanding attribute of the extended hybrid processing of the invention. It should be noted that while signal to noise performance is greatly improved, no information is lost (the removed lower frequency information is replaced in the receiver) and consequently distortion is not increased.

As mentioned, peak signal magnitude is the major factor in contributing to adjacent channel and co-channel interference problems. Such peaks, in the form of doublets and pulses, are produced in the extended hybrid processing in response to video edge and video detail, i.e. whenever the video level changes rapidly. As was also discussed above, the signal level during non-video portions of the signal (blanking periods) is arbitrarily established in the hybrid processing system. As has been shown in the basic hybrid system, the line averaged video is used to set the horizontal line signal level at the average signal level for that line. Consequently, when the blanking interval ends, the video signal level will in all probability be closer to its average value for the line than it would be to an arbitrary level that had been established. Therefore, the magnitude of video level change (and of the doublets produced by extended hybrid processing) will be minimized by setting the line to the average video level for that line. As mentioned in connection with the copending application, the transmitted video signal need not have horizontal blanking intervals, nor horizontal sync. It will, of course, have a line structure, and there will be transitions from line to line. These transitions appear as doublets when hybrid processed, and it would be of benefit to minimize their amplitude. Therefore two step processing is employed in which the line average of a line is removed with basic hybrid processing, prior to performing extended hybrid processing. Thus, two step hybrid processing is very desirable since with it, the level of the video signal between lines (and in the vertical blanking interval) is set to the average video signal level to reduce the magnitude of doublets produced. It is also contemplated that the average of adjacent video lines be used to reduce the doublet magnitude.

Figure 14:
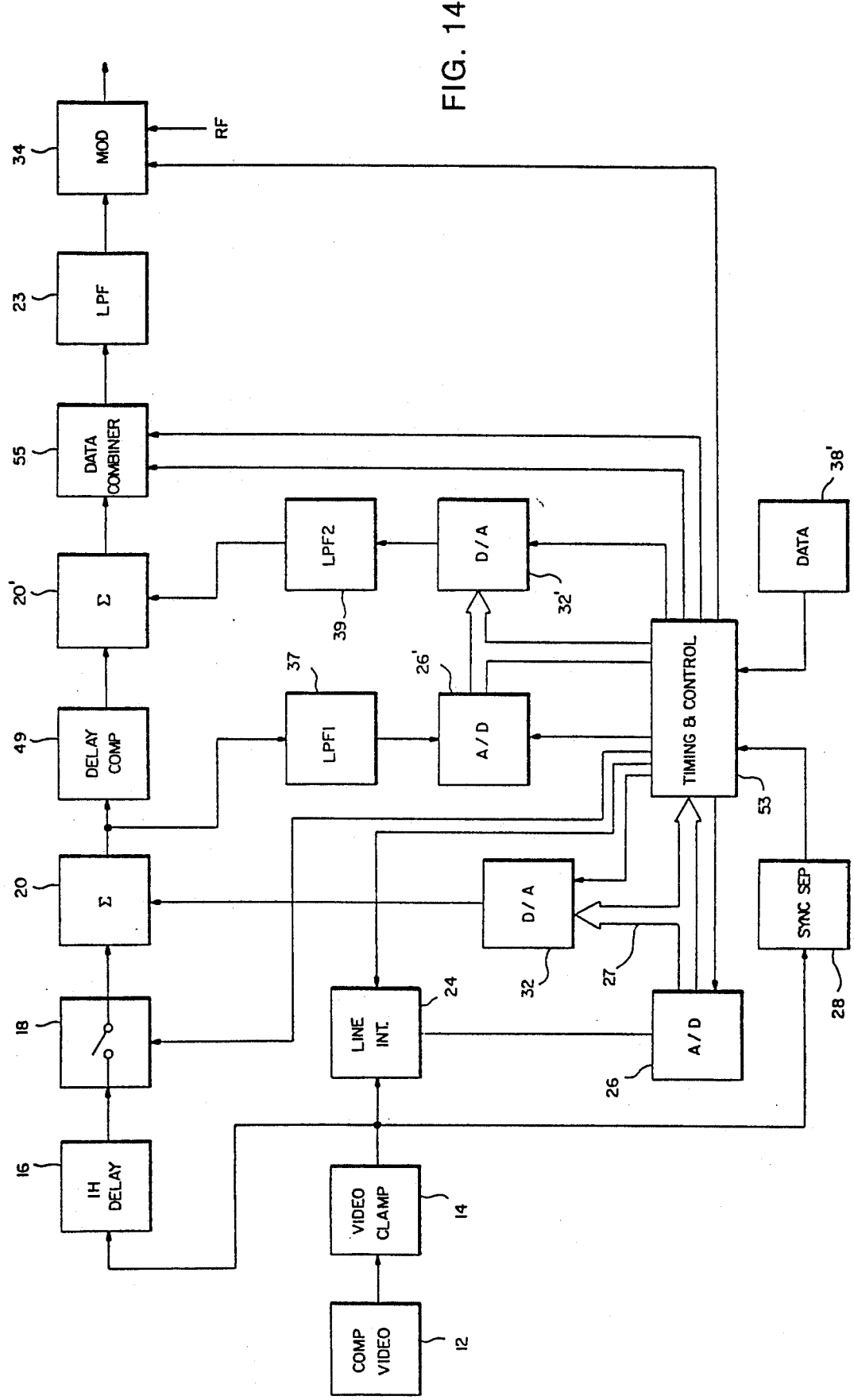
FIG. 14 is a block diagram of a transmitter illustrating two step hybrid processing in accordance with the invention.

FIG. 14 shows a transmission system that incorporates two step processing, i.e. first basic hybrid and then extended hybrid processing. The basic hybrid processing occurs by virtue of line integrator 24, A/D converter 26 and D/A converter 32, one H delay circuit 16, switch 18 and summing circuit 20. The extended hybrid processing occurs by virtue of filter 37, A/D converter 26', D/A converter 32', filter 39, delay compensation circuit 49 and summing circuit 201. The basic hybrid processing is performed first and is followed by the extended hybrid processing. Timing and control circuit 53 supplies appropriate timing and data signals to data combiner 55. As mentioned, the data is placed in nonactive video portions of the signal, which will generally comprise the vertical blanking periods or both horizontal and vertical blanking periods.

Figure 15:
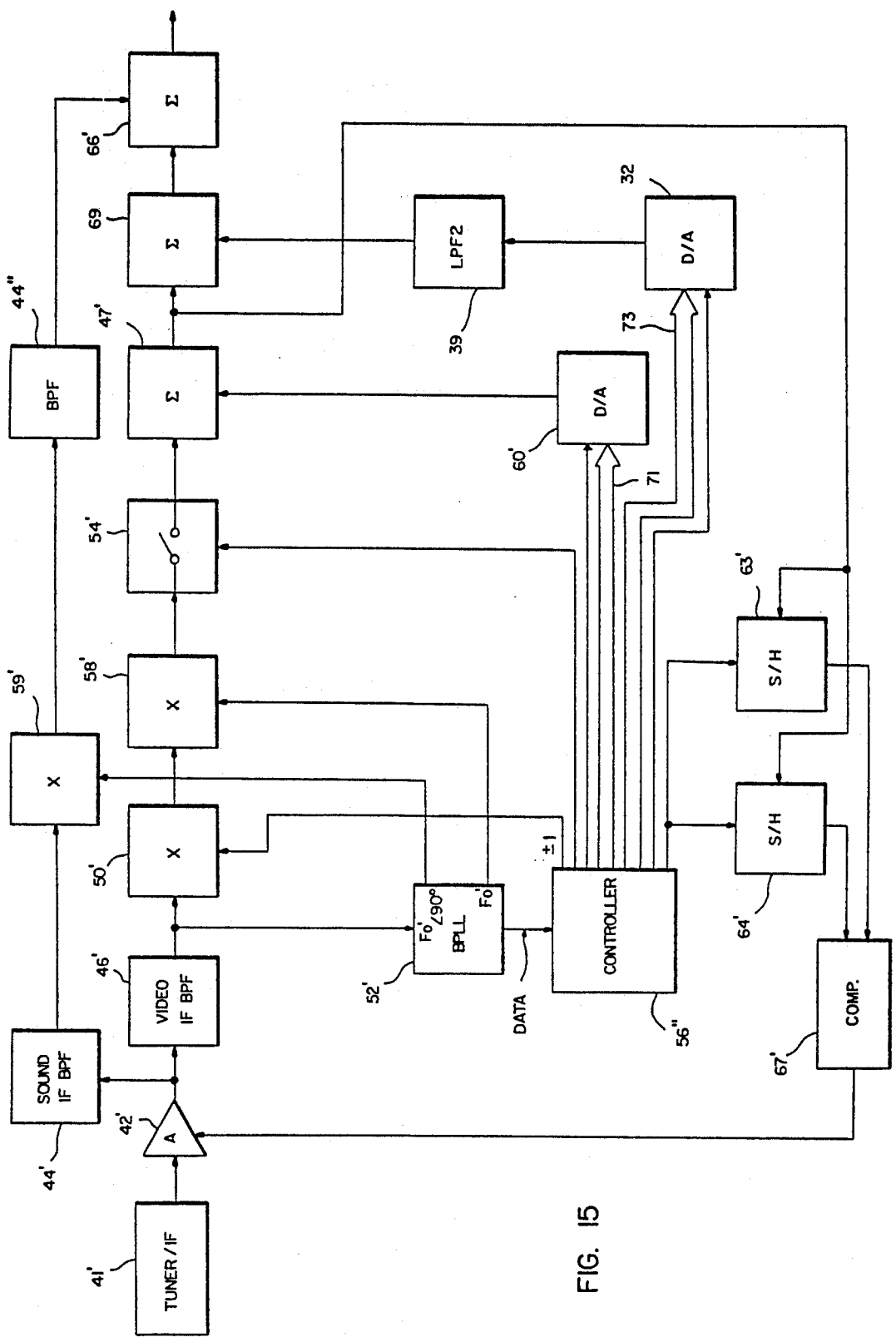
FIG. 15 is a block diagram of a receiver utilizing a two step hybrid processed signal.

FIG. 15 illustrates the basic hybrid receiver of FIG. 6 modified to accept a two step hybrid processed signal such as that produced by the transmitter of FIG. 14. The receiver includes a D/A 32 and a filter 39 which are supplied with the extended hybrid data by controller 56". After detection by BPLL 52', the removed basic low frequency information is added in summing network 47', and the remainder of the low frequency information is added in summing network 69. The frequency response characteristic of LPP2 filter 39 is, of course, the same as that of LPF2 39 in the transmitter, which is indicated by the same reference number being used for each.

The basic hybrid and extended hybrid processing of the invention, when combined with the techniques of temporal preemphasis or filtering (also referred to as frame combing or field processing) signal compression, time dispersal and preemphasis, yields a television system of optimal signal and noise characteristics.

Figure 16:
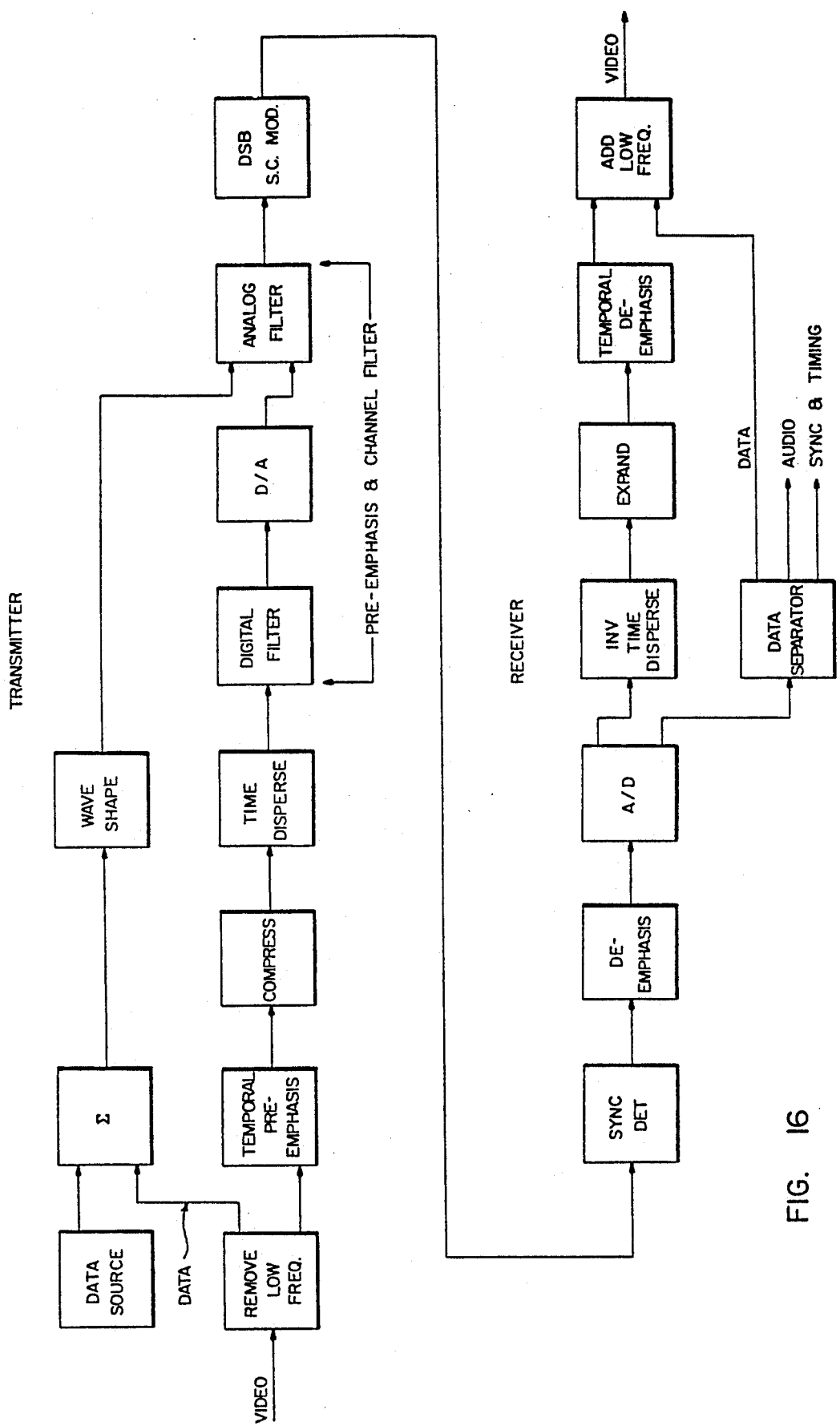
FIG. 16 is a simplified block diagram of an optimal television transmission and reception system using the principles of the invention.

In FIG. 16, such an optimal television system with minimum adjacent and co-channel interference includes a digital type transmitter having a hybrid processing stage (may be two step) to remove and digitally encode low frequency video components as data. The remaining signal is subjected to temporal preemphasis for emphasizing the changes between successive frames of video and then subjected to compression and time dispersion.

It will be appreciated by those skilled in the art that temporal preemphasis involves the reduction of low frequencies as does subtraction of low frequencies in hybrid processing. The present invention broadly embraces compressing a signal that has been subjected to low frequency reduction for reducing its interference causing potential. The dispersed signal is subjected to preemphasis and channel filtering before modulation on a double sideband suppressed carrier that is centered in a 6 MHz frequency band. The preemphasis and channel filtering may be accomplished by applying the time dispersed signal (in digital form) to a digital filter and then D/A converting it and applying it to an analog filter which also receives the representative data (hybrid) and other data after suitable waveshaping.

The receiver incorporates a true synchronous detector, followed by a signal de-emphasis stage and an A/D converter. The digitized signal is subjected to inverse time dispersion, expansion and temporal de-emphasis to obtain the digitized high frequency component. The removed low frequencies are reconstructed from the data and the original signal recovered by adding back the removed components. The system has very attractive advantages in minimizing adjacent channel and cochannel interference. Further, the carrier frequency may be arranged to have a "precise offset" frequency relationship with co-channel NTSC (or hybrid) signals. The precise offset frequency, as is well known in the art, should be a one-third or one-half multiple of the horizontal scan rate and a one-half multiple of the vertical scan rate. The effect of this precision offset is to break up sections of video, corresponding to DC, into lines of video (at about 10 KHz) which is visually much less perceptible on a television screen. Thus, a co-channel video display would be significantly broken up and thereby rendered much less noticeable. In accordance with the method of the present invention, the hybrid signal is frame locked to the NTSC co-channel to assure that the data portions of the hybrid processed signal (in which data is sent in the vertical blanking intervals) do not occur during video portions of the NTSC cochannel. In the copending application referred to above, the transmitted signal has no sync which further reduces the peak signal excursions and aids co-channel performance.

In FIG. 17, temporal preemphasis or prefiltering in the transmitter is illustrated. The video input signal is subjected to a delay of T (one field delay), multiplied by a factor "a" (less than one) and subtracted from the undelayed signal. Its impulse response and frequency response are shown. The opposite action occurs in the receiver as illustrated in FIG. 17 where the input signal is subjected to a delay of T, multiplied by the same amplification factor "a" and fed back to the signal.

Frame combing has been used in the prior art for separation of color signals. The benefit of frame combing or temporal filtering has not been recognized in encoding video signals for reduced power transmission. Its use in a hybrid television signal system reduces transmission power for static images and thereby helps to reduce interference of the hybrid signal into an NTSC co-channel and also to minimize co-channel interference from an NTSC channel into a hybrid signal receiver. The temporal preemphasis filter response for static images (zero temporal frequency) is at a minimum while its response for frequencies equal to T/2 is at a maximum. As shown, the response for static images is reduced to 1-a and at one-half the field rate, is increased. These numbers are of course a function of the actual filter design. Thus, the video signal corresponding to a static image is reduced significantly. Since most television pictures are relatively static, the overall interference into an NTSC co-channel will be reduced. For video motion, the interference into the NTSC co-channel, while not reduced, will be much less noticeable because fast moving video images (very small width moving edges) are difficult for the human eye to resolve.

The complementary receiver temporal de-emphasis or post filter in FIG. 18 has the opposite effect and is an infinite impulse response filter with a single pole which cancels the zero in the corresponding filter of the transmitter. The combined frequency response of the transmitter temporal filter and receiver temporal filter is flat and equal to 1. The response of the receiver temporal filter at zero temporal frequency (static input) is at a maximum while the response for moving images is at a minimum. In conjunction with the precision offset mentioned above, the static portions of the NTSC co-channel interference can be made to appear as one-half frame rate (T/2) temporal frequency components, falling into the troughs of the filter response and thereby be reduced significantly.

Signal preemphasis and de-emphasis may be used to help improve the noise performance of the hybrid signal. Circuitry therefor is not illustrated since it involves well known boosting of the high frequencies during transmission and reducing or rolling off the boosted high frequencies in the receiver. The receiver filter may have a haystack shape and sharply discriminate against adjacent channel frequencies.

A compander compressor is illustrated in FIG. 19 and a compander expander is illustrated in FIG. 20. Companding (that is compressing and expanding) improves interference performance both to and from an NTSC co-channel. This is so, since with hybrid processing, high signal amplitudes only occur during transitions, such as on video edges or in video detail. (With temporal preemphasis, high signal amplitudes only occur on moving edges.) As seen in FIG. 19, the compressor has a nonlinear transfer characteristic that raises the level of low amplitude signals and lowers the level of high amplitude signals. By reducing the amplitude of the highest amplitude signals, the signal peaks that cause co-channel interference are reduced. The low amplitude signals are increased, but they are not the peak signals that are responsible for co-channel interference. In the receiver, the expander transfer characteristic is complementary (see FIG. 20), so that the overall effect on the signal is flat. The expander, it will be noted, also serves to reduce interference from the NTSC co-channel into the hybrid signal channel. The NTSC co-channel will, under the worst conditions, be a low amplitude signal and the hybrid signal exhibits high amplitudes only during video movement and for video detail. The hybrid receiver will receive a signal that will be a sum of the low amplitude co-channel and the hybrid signal. In areas of low detail, where the co-channel interference will be most visible, the combined signal levels of the co-channel and hybrid signal will still be small and the expander will further reduce that by the inverse of the amplification factor of the compressor. Thus, the most visible interfering signals are reduced. During moving video and video detail in the hybrid signal, where the co-channel is least visible, the combined levels of the co-channel and hybrid signal is high and will be further increased by the expander characteristic. The result is that the co-channel interference is shifted from low video detail (flat, stationary) areas to high detail and moving areas where it is much less visible. As mentioned, both hybrid processing and temporal preemphasis involve low frequency reduction of the signal which, in combination with compression of the signal, yields great benefits in video signal transmission characteristics. Noise is also processed as co-channel interference and therefore the same improvement is obtained with respect to noise performance. The compression process may create distortion products in the video signal which can be compensated for by suitable peaking.

A system having a temporal prefilter as indicated in FIG. 17 in the transmitter and a temporal post filter as illustrated in FIG. 18 in the receiver, as mentioned above, has benefits in minimizing interference between an HDTV signal and an NTSC co-channel signal where the HDTV carrier is precisely offset such that static NTSC interference falls in the nulls of the post temporal filter of FIG. 18. As will be recognized, the post temporal filter in FIG. 18 is a recursive feedback configuration, which inherently has a higher Q than the feed forward configuration of FIG. 17. Thus the nulls are sharper in FIG. 17 than the nulls in FIG. 18. There is also a need to insure that "a" is less than 1 since at "a" equals 1, the impulse response of the FIG. 18 filter is increased and noise is perpetuated throughout the receiver. Thus while the noise may be temporally stretched and of lower amplitude, it becomes grainier and more visible. While it is desirable to increase the value of ? tall to increase the depth of the nulls, the ability to do so is limited because of the noise problem.

In FIG. 21, a recursive feedback type filter and response are shown for use in the transmitter of FIG. 16, whereas in FIG. 22 a feed forward filter and response are shown for use in the receiver of FIG. 16. It will be appreciated that these are the opposite of the arrangements illustrated in FIGS. 17 and 18. The purpose of the FIGS. 21 and 22 implementation is to enable the value "a" to be increased without suffering the resulting degradation with the recursive filter in the transmitter and the matched feed forward filter in the receiver. Since the receiver does not perform a recursive operation, "a" can be increased without perpetuating the noise. In this configuration, the HDTV signal will cause less interference to an NTSC co-channel receiver, but the HDTV receiver will be more affected by interference from the NTSC co-channel transmitter. The possibility of the signals falling at the peaks of the recursive filter arrangement is relatively small and the fact is that noise, which is of a random nature and will therefore fall equally on peaks and in valleys, will be significantly reduced. Further, the possibility of heavy peaking due to the precise matching of the impulse response of the transmitter filter with an HDTV image pattern can be guarded against by signal clipping.

Referring generally to FIG. 16 and specifically to FIG. 23, dispersal filtering is performed on the video signal to reduce signal peak amplitudes and therefore the interference causing potential of the video signal. Obviously, an inverse time dispersion filter (time compression) is used in the receiver to provide complementary processing to that performed in the transmitter. With specific reference to FIG. 23, the video input signal is applied to a series of delay circuits P1, P2, P3 . . . PN. After each delay, the signal is applied to a processor such as multipliers X1, X2, X3 . . . XN, each of which is respectively controllable by a programmable factor indicated as U1, U2, U3 . . . UN. The outputs of the respective multipliers are applied to an adder which develops the dispersed video output signal. It will be appreciated that, in a pixel element system, if each delay P is equal to one pixel, the resulting output signal will be horizontally dispersed. The number of pixel delays in the dispersed video signal is of course a matter of preference, and based upon somewhat subjective criteria as to what produces the best results. Currently pixel delay systems covering 30 to 40 horizontal pixels are being implemented.

In FIG. 24, a similar arrangement is shown for dispersing the video signal horizontally, but the output from the adder is supplied as the input to another dispersal filter having delay elements H1, H2, H3 ... HN and processing elements (multipliers) Y1, Y2, Y3 ... YN that are controllable by programmable factors V1, V2, V3 ... VN, respectively. The outputs of the multipliers are supplied to another adder which develops a horizontally and vertically dispersed video signal. In the disclosed implementation, the H delays each correspond to one horizontal line (of pixels) to produce vertical dispersion of the video signal. In practice about 16 horizontal delay elements H have been used in the dispersal filter and the combination of horizontal and vertical dispersal is believed to significantly reduce the noise "visibility" of the resultant signals.

Figure 25A:
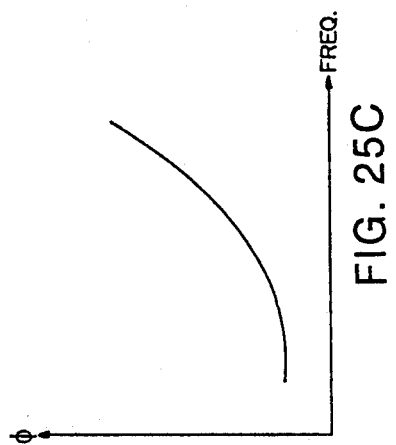
FIGS. 25A-25C are a prior art series of curves for dispersal filters.
Figure 25B:
Figure 25C:
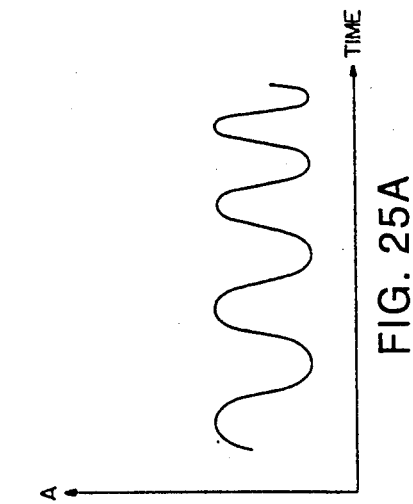

In FIG. 25 the prior art characteristic curves for a conventional dispersal or "chirp" filter are illustrated showing amplitude as a function of time, and group delay and phase as a function of frequency. The chirp signal amplitude is substantially constant, the group delay is a linear function of frequency and the phase delay is somewhat asymptotic with frequency.

Figure 26A:
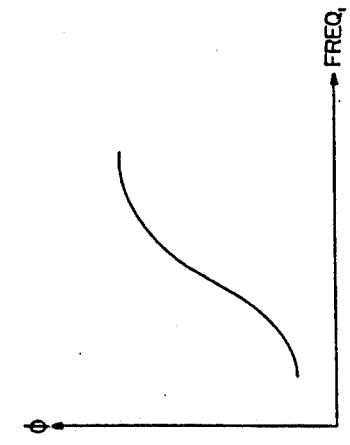
FIGS. 26A-26C are a similar series of curves for a horizontal and vertical dispersal filter.
Figure 26B:
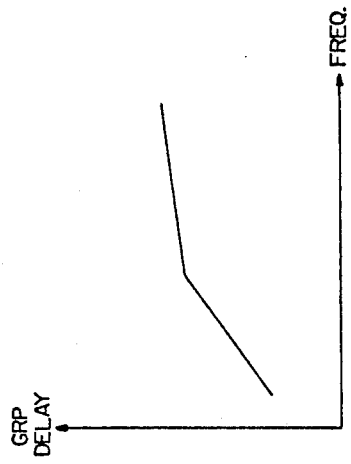
Figure 26C:
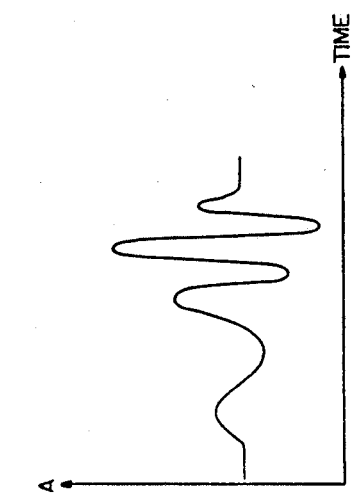

FIG. 26 illustrates the arrangement of the dispersal filter in a preferred form of the invention. The signal amplitude is seen to be non linear with time, i.e. the lower frequencies have a smaller amplitude than in a conventional chirp filter and the higher frequencies have a correspondingly higher amplitude. This is illustrated by the segmented group delay characteristic curve showing the lower frequencies experiencing greater dispersion than the higher frequencies. The phase characteristic curve is shown for comparison purposes. The benefit of such a non uniform group delay is that lower frequency signals, in which noise is more visible, are stretched to produce lower amplitudes, which results in an optimized visible interference arrangement. While the high frequency portions of the dispersed signal have higher amplitudes (which give rise to greater interference potential) that is offset by the lower visibility of noise in high frequency video. Thus the characteristic of prior art type chirp filters in which uniform dispersion gives the lowest peak signal amplitude is departed from in an effort to optimize the video effects of the dispersion process.

The effects of time dispersion are especially beneficial in conjunction with the temporal filtering previously discussed. This is because temporal filtering leads to the development of pulse or peak type signals for movement in the video, which peaks may then be temporally dispersed to lower their amplitudes.

The transmission systems and methods described are not to be considered limiting of the broad aspects of the invention. It is recognized that numerous modifications in the described embodiments of the invention may be made by those skilled in the art without departure from its true spirit and scope. The invention is to be limited only as defined in the claims.

What is claimed is:

1. A method of transmitting a first television signal and data to minimize interference with the transmission of a second television signal, said television signal each being composite signals including separate and unrelated synchronizing information, comprising the steps of:

formatting said first television signal to have a vertical periodicity that is the same as the vertical periodicity of said second television signal;

encoding data in the vertical intervals of said first television signal; and transmitting said first television signal such that the vertical intervals thereof occur in substantial time coincidence with the vertical intervals of said second transmitted television signal, whereby said data encoded in the vertical intervals of said first television signal is transmitted in substantial time coincidence with the vertical intervals of said second television signal.

2. A method of transmitting a first television signal including encoded data to minimize interference with the transmission of a second television signal, said first and said second television signals being composite signals having separate and unrelated synchronizing information, comprising the steps of:

encoding selected components of said first television signal for transmission as data in the vertical intervals thereof;

establishing the field structure of said first television signal to correspond to the field structure of said second television signal; and locking said field structure of said first television signal to the field structure of said second television signal to cause data in said first television signal to be transmitted in substantial time coincidence with the vertical intervals of said second television signal.

3. The method fo claim 2 wherein said data represents the low frequencies of said first television signal.

4. A method of transmitting a first television signal including coded data to minimize interference with the transmission of a second television signal comprising the steps of:

formatting said first television signal to have a high frequency portion with low transmission power demand and a coded digital representation, in the form of data, of a low frequency portion normally having high transmission power demand;

establishing the field structure of said first television signal to correspond to the field structure of said second television signal;

encoding said data in the vertical intervals of said first television signal; and transmitting said first television signal such that the vertical intervals thereof occur in substantial time coincidence with the vertical intervals of said second television signal, whereby said data is transmitted in substantial time coincidence with the vertical intervals of said second television signal.

5. A method of transmitting a first television signal to minimize interference with a transmitted second NTSC television signal comprising the steps of:

formatting said first television signal to include high frequency components, and digital representations of low frequency components, said digital representations being encoded as data in the vertical intervals of said first television signal;

establishing the field structure of said first television signal to correspond to the field structure of said second NTSC television signal; and locking said field structure of said first television signal to the field structure of said second NTSC television signal to cause data in said first television signal to occur in substantial time coincidence with the vertical intervals of said second NTSC television signal.

* * * * *